United States Patent [19]
Hjerten et al.

[11] Patent Number: 5,135,650
[45] Date of Patent: Aug. 4, 1992

[54] CHROMATOGRAPHY STATIONARY PHASE MATERIAL FOR HIGH PERFORMANCE LIQUID CHROMATOGRAPHY

[75] Inventors: Stellan Hjerten; Jia-Li Liao, both of Uppsala, Sweden

[73] Assignee: Bio-Rad Laboratories, Inc., Hercules, Calif.

[21] Appl. No.: 518,038

[22] Filed: May 2, 1990

Related U.S. Application Data

[63] Continuation-in-part of Ser. No. 370,921, Jun. 23, 1989, abandoned, which is a continuation-in-part of Ser. No. 288,600, Dec. 22, 1988, abandoned.

[51] Int. Cl.$^5$ .............................................. B01D 15/08
[52] U.S. Cl. ............................. 210/198.2; 210/502.1; 210/635; 210/656; 502/404; 502/439; 536/18.3; 536/120
[58] Field of Search ............... 536/18.3, 120; 210/635, 210/656, 198.2, 502.1; 502/404, 439; 530/413, 417

[56] References Cited

U.S. PATENT DOCUMENTS

| | | | |
|---|---|---|---|
| 3,527,712 | 9/1970 | Renn | 210/635 |
| 3,873,514 | 3/1975 | Chu | 210/635 |
| 3,960,720 | 6/1976 | Porath | 210/635 |
| 3,976,767 | 8/1976 | Neurath | 210/635 |
| 4,076,930 | 2/1978 | Ellingboe | 210/635 |
| 4,143,201 | 3/1979 | Miyashiro | 210/635 |
| 4,335,017 | 6/1982 | Miles | 210/635 |
| 4,421,650 | 12/1983 | Nagasawa | 210/635 |

OTHER PUBLICATIONS

Hjerten, S. et al., "The Design of Agarose Beds for High-Performance Hydrophobic-Interaction Chromatography and Ion-Exchange Chromatography Which Show Increasing Resolution with Increasing Flow Rate," *Makromol. Chem.*, Macromol. Symp. 17, 349-357 (1988).

Hjerten, S. et al., "High-Performance Liquid Chromatography of Proteins On Compressed, Non-Porous Agarose Beads," *J. Chromatography* 457, 165-174 (1988).

Liao, J.-L., et al., "High-Performance Liquid Chromatography of Proteins on Compressed, Non-Porous Agarose Beads," *J. Chromatography* 457, 175-182 (1988).

Hjerten, S., et al., "High-Performance Liquid Chromatography of Proteins on Deformed Non-Porous Agarose Beads—Fast Boronate Affinity Chromatography of Haemoglobin at Neutral pH," *J. Chromatography* 500, 543-553 (1990).

Hjerten, S., et al., "High-Performance Chromotofocusing of Proteins on Agarose Columns," *J. Chromatography* 475, 177-815 (1989).

Kopaciewicz, W., et al., "Stationary Phase Contributions to Retention in High-Performance Anion-Exchange Protein Chromatography: Ligand Density and Mixed Mode Effects," *J. Chromatography* 318, 157-172 (1985).

Eriksson, K.-O., "Glycidol-Modified Gels for Molecular-Sieve Chromatography. Surface Hydrophilization and Pore Size Reduction," *J. Biochem. Biophys. Meth.* 15, 105-110 (1987).

Hjertsen, S., et al., "An High-Performance Liquid Chromatographic Matrix Based on Agarose Cross-Linked with Divinyl Sulphone," *J. Chromatography* 396, 101-113 (1987).

*Primary Examiner*—Ernest G. Therkorn
*Attorney, Agent, or Firm*—Townsend and Townsend

[57] ABSTRACT

Highly compressible chromatographic stationary phase particles such as agarose beads are made rigid to a degree suitable for use in HPLC, and nonporous to proteins by one of two procedures. The first involves shrinking the beads with the use of an organic solvent in which the agarose bead will neither dissolve nor swell to collapse the porosity, followed by crosslinking the bead surfaces inside the collapsed pores to fix the pores in their collapsed state. The second involves filling the pores (without shrinkage of the beads) with a polymerizable substance which grafts to the pore surface, and performing the graft polymerization. The invention also extends to rigid beads, which are rendered deformable to a limited degree by coating the surface with a polymer. Finally, porous rigid beads are rendered nonporous by polymerizing a polymerizable material inside the pores in the same manner as the porous compressible beads.

12 Claims, 13 Drawing Sheets

CHROMATOGRAPHY STATIONARY PHASE MATERIAL FOR HIGH PERFORMANCE LIQUID CHROMATOGRAPHY

CROSS REFERENCE TO RELATED APPLICATIONS

This application is a continuation-in-part of Ser. No. 07/370,921, filed Jun. 23, 1989, which is a continuation-in-part of application Ser. No. 07/288,600, filed on Dec. 22, 1988, both now abandoned.

BACKGROUND OF THE INVENTION

This invention is in the field of chromatographic support media. The invention itself is directed to support media which is nonporous to the extent that it is impenetrable by solutes, particularly macromolecular solutes, and to methods of preparing such media from porous starting materials.

High-performance liquid chromatography (HPLC) is widely used for analytical and preparative separations of biopolymers. Columns for HPLC generally use smaller and more rigid beads as stationary phase supports than do columns for conventional, low-pressure chromatography. Silica, for example, is a commonly used stationary phase in HPLC. Agarose beads, on the other hand, are more common in low-pressure chromatography. Agarose beads can be adapted for use in HPLC by being made smaller (3–10μ diameter) and more rigid (Hjertén, S. et al., *J. Chromatogr.* 215, 137 (1981); Hjertén, S., *Acta Chem. Scand.* B36, 203 (1982); Hjertén, S., et al., *J. Chromatogr.* 296, 115 (1984), but this is done by a procedure which is expensive and laborious. Furthermore, the resulting beads are still compressible to some extent, and compression considerably increases the flow resistance around the beads, which is undesirable in some cases. A maximum linear velocity of 3 cm/min for a 30 cm long molecular-sieve chromatography column, for example, has been reported by Hjertén, S., et al., *J. Chromatogr.* 316, 301 (1984).

In some cases, compressibility of the stationary phase is desirable since it decreases the distance between individual beads. Relatively large beads, which are easy to prepare, can thus be given chromatographic properties equivalent to smaller beads simply by being compressed.

When compressibility is combined with a porosity which is sufficiently low that the beads are effectively nonporous—i.e., any remaining pores are so small or so narrow as to be substantially impermeable to the solutes in the sample being separated—further advantages are achieved. With the solutes no longer diffusing into and out of the beads, the chromatographic interactions can be restricted to the external surfaces of the beads, resulting in sharper resolutions and faster flow rates.

SUMMARY OF THE INVENTION

The present invention arises from several discoveries that lead to the production of semi-rigid beads or particles which are impermeable to proteins, for use as stationary phase support media for HPLC. One such discovery is a technique by which rigid incompressible porous beads may be made both moderately compressible and nonporous. Another is that the same or an analogous technique may be applied to soft and highly compressible porous beads to make them more rigid (i.e., to a degree suitable for HPLC) yet still compressible, and nonporous. The degree of rigidity of the final bead in each case is one which is suitable for HPLC usage. The compressibility, on the other hand, is a feature which promotes rapid interaction of the solute with the stationary phase in chromatography by decreasing the interstitial distances between beads. Finally, the lack of porosity is a feature which promotes lower retention times and thus faster separations. In the context of this specification, terms such as "nonporous" and "lack of porosity" are used to indicate an impermeability to proteins and other macromolecular solutes. Thus, certain porosities which are detectable by conventional measurement techniques but too low to permit protein infusion are intended to be included within these terms. Porosities which meet this description will be readily apparent to those skilled in the art.

Further discoveries contributing to this invention relate to its application to agarose beads. For example, it has now been discovered that when the water in macroporous agarose gel beads is displaced by a two-step solvent treatment which results in substantially all liquid in the beads being replaced by an organic solvent which neither swells nor dissolves the agarose, the porous gel structure collapses into nonporous beads. The first step of the treatment is a partial displacement of the water with a first organic solvent which tends to partially dissolve the agarose while still swelling it. The second stage of the treatment is a total displacement of the water and the first organic solvent by a second organic solvent which, as described above, neither swells nor dissolves the agarose. When the collapsed beads resulting from this two-stage treatment are cross-linked in the organic solvent, the agarose retains its collapsed structure even when the organic solvent is replaced by water. The beads will thus remain nonporous in an aqueous medium as well.

An additional discovery has arisen from the treatment of macroporous agarose beads with a solution of a monomer which becomes affixed, or grafted, to the agarose while the monomer polymerizes. This discovery is that the monomer fills the pores of the agarose during the polymerization, displacing the water and thereby rendering the beads nonporous. The nondissolving and nonswelling organic solvent is not required and the structure of the beads does not collapse. The polymeric structure thus formed may be further maintained and stabilized by crosslinking, resulting in agarose beads which, if the polymerization occurred in a nonaqueous medium, can be returned to an aqueous medium and yet remain nonporous. Alternatively, the agarose itself may be crosslinked before the graft polymerization, with equivalent results in terms of a stabilized polymeric structure.

In its application to rigid beads or particles such as silica, the present invention results in the formation of a polymer coating on the outside surface of the bead or particle, the coating being sufficiently soft to impart a degree of compressibility to the otherwise noncompressible material. The resulting compressibility provides the bead or particle with the ability to respond to pressure by decreasing the interstitial distance between the beads, thereby achieving the benefits described above. Simultaneous with the formation of this outer polymer coating is the filling of the pores with polymerized monomer, in a manner analogous to that which occurs in compressible beads such as agarose. Coupling agents to bind the monomer to the bead or particle surface are used when necessary. The result, as in the case of support media which are highly compressible prior to treatment, is the formation of a substantially nonporous stationary support phase from a porous starting material.

Regardless of whether the starting material is compressible or rigid, the bead or particle once having been treated as described above may then be surface derivatized to contain functional groups appropriate for the desired chromatographic interaction. The interaction will be limited to the outer surface, and solute flow will not be detained by diffusion into and out of pores. Derivatization is achieved by conventional means and a wide range of interactions may thus be achieved.

Advantages provided by the present invention include the fact that a single stationary phase prepared in accordance with the invention is effective at high pressures and yet can be used at low pressures as well to achieve higher flow rates, plus the fact that solute resolution is virtually independent of, or increases with an increase in, flow rate. Other benefits, features and advantages of the invention are disclosed in the following sections of this specification.

The present invention thus provides a method of preparing stationary phase support media which are suitable for HPLC and yet have the properties of being both nonporous (i.e., impermeable to proteins and peptides) and compressible to a limited or controlled extent sufficient to decrease the interstitial distances in the packed bed in an HPLC column.

BRIEF DESCRIPTION OF THE DRAWINGS

FIG. 1-$a$ is with beads crosslinked with 1,4-butanediol diglycidyl ether. FIG. 1-$b$ is with beads crosslinked with $\gamma$-glycidoxy-propyltrimethoxy silane.

DETAILED DESCRIPTION OF THE INVENTION AND PREFERRED EMBODIMENTS

Figure 1A:
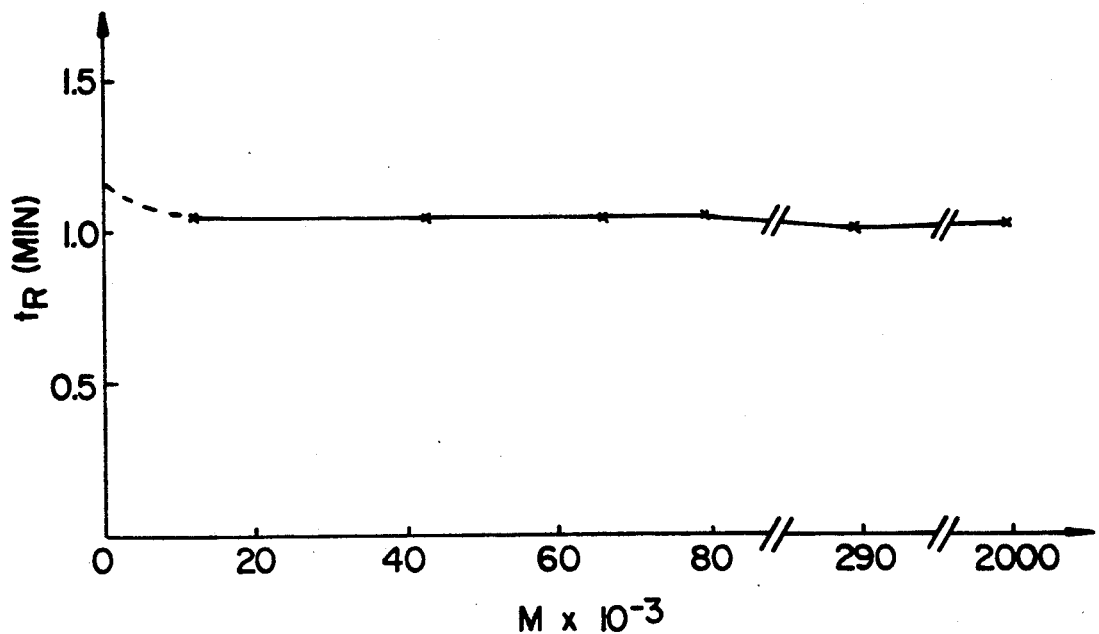
FIGS. 1A and 1B are two plots of the retention times for proteins of different molecular weights in a column packed with nonporous agarose beads in a molecular-sieve chromatography experiment.

In its various embodiments, the present invention extends to procedures using as starting materials a wide variety of chromatographic stationary phase support media in the forms of particles or beads. These stationary phase materials range from highly compressible materials such as certain forms of agarose to rigid and entirely noncompressible materials such as silica. In general, the invention applies to any material to which a polymerizable substance can be bound. Preferred such materials are those with accessible active coupling sites, such as active oxygens, particularly hydroxyls, oxo groups and epoxide groups.

Common solid phase chromatographic bed support materials are preferred as the starting materials. Notable examples are agarose and silica.

For embodiments of the invention using agarose beads as starting materials, agarose beads prepared by conventional techniques may be used. For example, agarose beads may be prepared from solutions of relatively high agarose concentrations (approximately 8% to 20%, and preferably 10% to 15% by weight in water). For complete dissolution of agarose at these concentrations, boiling at a pressure of 2 bar is recommended. An organic solvent and a stabilizer, such as polyoxyethylene sorbitan monostearate for example, are added to the agarose solution, and the entire mixture is heated to a temperature of about 50° C. Upon vigorous stirring, beads of agarose solution are formed in the organic phase while the stabilizer prevents the beads from coalescing. The temperature is then lowered and gelation starts. The organic solvent is removed by washing with an organic solvent miscible with water, and finally with water. The gel beads may be sized by elutriation in distilled water.

Different types of agar contain agarose chains of somewhat different structures. For the preparation of agarose for use in HPLC, preferred agar types are those which have an agarose moiety with a low methoxy content (to suppress hydrophobic interactions) and few carboxylic groups (to suppress electrostatic interactions). While methods for decarboxylation of agarose are known, it is more practical to use agar types which contain agarose chains with few carboxylic groups.

For embodiments using porous silica particles or other porous rigid materials as starting materials, the initial porosities may vary widely. In most cases, such particles will have initial average pore diameters ranging from about 30 Å to about 300 Å, preferably from about 60 Å to about 150 Å.

For embodiments using porous particles as starting materials, whether they be compressible or rigid and whether or not the practice of the invention involves shrinkage of the particles or not, as well as for embodiments using nonporous particles as starting materials, the particle size may vary widely in the practice of the present invention. In most applications, the particles will range from about 1 micron to about 1000 microns in average diameter.

Preferred ranges for particular types of particles may vary. In the case of agarose, for example, preferred particles are those with an average diameter of from about 3 microns to about 300 microns, and particularly preferred particles are those with an average diameter of from about 10 microns to about 100 microns. In the case of silica, preferred particles are those with an average diameter of from about 5 microns to about 500 microns, and particularly preferred particles are those with an average diameter of from about 10 microns to about 100 microns.

In one embodiment of the application of the present invention to porous starting materials, a polymerizable substance is placed inside the pores of the particles and permitted to polymerize, thereby at least partially occupying the pore space and effectively lowering the porosity. The polymerizable substance is one which also binds to the internal pore surface.

This polymerizable substance may be any of a wide range of monomers and prepolymers. For agarose and silica beads, examples of monomers which exhibit properties which bind them to the bead surface while they are polymerizing are glycidol (2,3-epoxy-1-propanol), acrylamide, N-methylolacrylamide, and water-soluble acrylates. Polymerization may also be done in combination with additional polymers or prepolymers such as various forms of dextran.

In some cases, it may be desirable or necessary to use a coupling compound as an intermediate binding agent between the bead surface and the polymer. In binding acrylamide to any matrix containing hydroxyl groups, for example, allylglycidyl ether may be used as a coupling agent, the epoxide group to react with the agarose, and the allyl group to react with the acrylamide. Another example of a coupling agent serving a similar purpose is $\gamma$-methacryloxypropyltrimethoxy silane.

In another embodiment of the present invention, porous agarose particles of sufficient porosity to be permeable to proteins (referred to hereinafter as "macroporous" agarose particles) are shrunken to reduce the pore size. In this embodiment, "shrinkage" of the beads entails the weakening of the agarose to permit collapse of the open-pore structure, followed by replacing all liquid in contact with the agarose with a nonswelling organic solvent. While not intending that this aspect of the invention be bound to any particular theory, the inventors believe that one possible explanation for the mechanism occurring in the weakening step is the breakage of the hydrogen bonds connecting the bundles of polysaccharide double helices in the agarose. Other mechanisms can be envisioned, however. Once the weakening is achieved, it is followed by the collapse of the porous gel structure. This collapse or shrinkage is accomplished by treatment of the macroporous beads with organic solvents, ultimately replacing all liquid in the beads with an organic solvent which will neither dissolve nor swell the agarose. By this shrinkage, one can decrease the bead volume to about 20% of the original volume, thereby forming shrunken, nonporous gel beads.

The first stage, i.e., the agarose weakening stage, of the treatment is accomplished by introducing a first organic solvent into agarose beads which have been gelled in an aqueous solution. This involves a partial displacement of the water in the beads, and the solvent is one which is miscible with water, while being one which tends to dissolve the agarose and yet retains the swelled condition of the beads. The first solvent is applied under conditions which avoid totally dissolving the agarose. The conditions may either be a controlled temperature condition, a controlled proportion of the first solvent to water, control of other system variables, or a combination. Under these conditions, the first stage treatment will leave the agarose in the form of individual beads, but will sufficiently weaken the agarose to permit collapse of the pore structure in the second stage of the treatment when the second organic solvent is introduced. In preferred procedures, the water is only partially displaced by the first solvent, the optimum volume ratio varying with the choice of solvent. For most systems, a solvent:water volume ratio ranging from about 0.5:1 to about 2.0:1 will provide the best results. Examples of organic solvents which can serve as this first solvent are dioxane, formamide, dimethylformamide and dimethyl sulfoxide.

The second stage of the treatment is accomplished by displacing all of the first organic solvent and any remaining water in the beads by a second organic solvent. This second organic solvent is one which neither dissolves nor swells the agarose, and hence causes the weakened pore structure to collapse. A wide variety of organic solvents meet this description. Examples are alkanes, such as pentane and hexane; haloalkanes, such as chloroform and carbon tetrachloride; cycloalkanes, such as cyclohexane; aromatics, such as benzene, xylene and toluene; heteroaromatics, such as furan and tetrahydrofuran; and alcohols, such as ethanol.

In addition to these qualities, the second organic solvent is preferably also one which does not promote aggregation of the agarose beads. Still further, this second solvent is preferably one which is fully miscible with the first solvent, thereby facilitating the removal of both the first solvent and any residual water from the agarose. Once the beads are shrunken by this second stage treatment, the beads are crosslinked with a crosslinking agent to fix the beads in the shrunken state.

Crosslinking is used in various embodiments of the invention for different purposes. In embodiments involving shrinkage of porous compressible beads by replacement of water in the bead pores with an organic solvent, for example, crosslinking serves to hold the internal pore walls together and thereby fix the shrinkage. In embodiments which do not involve shrinkage, crosslinking serves to stabilize the polymer, whether the polymer is filling the pores, coating the bead surface or both. This helps maintain the nonporous condition of the beads in aqueous media, since both the polymerization and the crosslinking generally occur in nonaqueous media. For embodiments using compressible beads as starting materials, crosslinking imparts mechanical stability which further enhances the rigidity needed for utilization of the beads in HPLC.

For crosslinking agarose beads, a variety of bifunctional crosslinking agents may be used. These include divinyl sulphone and other crosslinking vinyl compounds; epihalohydrins, such as epichlorohydrin and epibromohydrin; epoxides, bisepoxides and trisepoxides; and chemical compounds that can be converted under the reaction conditions and otherwise during the course of reaction to any of the above agents, such as 2,3-dichloro-1-propanol. For use in the present invention when the macroporous beads are shrunk, epoxides, bisepoxides and trisepoxides are preferable as crosslinking agents. A mixture of epoxides, or of bis- or trisepoxides of different chain lengths, or successively used, may give a still higher rigidity. There are accordingly many possibilities, known among those skilled in the art, to vary the structure of the crosslinkers and thus the rigidity of the agarose beads. Examples of epoxide-type crosslinkers include 7-glycidoxypropyltrimethoxy silane and 1,4-butanediol diglycidyl ether.

For embodiments involving pore-filling rather than shrinkage, a similar variety of crosslinkers may be used, the appropriate choice depending on the polymer being crosslinked. For such embodiments, the vinyl crosslinking agents, and particularly divinyl sulphone, are preferred. Divinyl sulphone imparts a somewhat hydrophobic character to the bead matrix.

The crosslinking may be performed in an appropriate organic solvent such as chloroform, carbon tetrachloride, or hexane, and with a catalyst such as boron trifluoride, boron trifluoride diethyl etherate or stannic chloride.

In each of the embodiments described above, the beads are transformed to a state in which their porosity is low enough to prevent penetration by most proteins, peptides and nucleic acids. In preferred embodiments, the porosity is sufficiently reduced to prevent penetration by proteins of molecular weight of 10,000 or higher. In particularly preferred embodiments, the porosity is sufficiently reduced to prevent penetration by proteins of molecular weight of 3,000 or higher.

For embodiments which involve imparting a compressibility to otherwise rigid beads, the invention involves coating the exterior of the beads with the polymerizable substance described above, and polymerizing the substance while bonding it to the surface. The polymer coating increases the bead diameter and its resiliency permits the beads to be compressed against each other, thereby decreasing the interstitial distance in a packed bed.

Once the beads or particles have been rendered nonporous with the desired compromise between compressibility and rigidity, the bead surfaces may be derivatized for ultimate use in a chromatography column. The type of derivatization may vary widely, and will be selected on the basis of the separation mechanism to be used. Derivatization will be achieved by the attachment of species with functional groups suitable for the separation mechanism, such as hydrophobic groups and ion exchange groups. The appropriate groups, species, and methods of attachment will be readily apparent to those skilled in the art.

When utilized as packing material in HPLC, columns of beads prepared in accordance with the present invention are characterized by a resolution that is virtually independent of the flow rate. In some cases in fact, an increase in resolution with an increase in flow rate is observed. This is a very surprising result which is contrary to the generally accepted theory of chromatography. Thus, higher flow rates may be used with little or no loss in resolution. This makes the beads very useful in that small sample sizes may be separated in an unusually short period of time while still obtaining high resolution among the components. An additional advantage of the use of beads prepared in accordance with this invention is that only a few bed volumes are required for regeneration. Such advantages are obtained with up to five-fold larger bead diameters than the prior art macroporous crosslinked agarose beads.

As the following examples will demonstrate, chromatographic properties of initially porous beds made nonporous by filling the pores with a polymer attached to the bead matrix are very similar to those of nonporous agarose beads prepared by shrinkage. Among these properties is the feature that the resolution is independent of, or increases with, increase in flow rate, as described in the preceding paragraph. One possible reason for this behavior is that the flow pattern may be such that it increases the transport velocity of a solute between the mobile and stationary phases. This would not be expected to have the same effect on low-molecular-weight compounds which penetrate the beads. In some of the examples herein, however, low-molecular-weight substances exhibit the same relation between plate number and flow rate as proteins. This indicates that at least in some cases, the it is only the surface of the beads which has an open structure and that even low-molecular-weight compounds are excluded from the core. This exclusion may be due to steric hindrance, but may also be due in part to partition of the solutes toward the mobile phase.

As mentioned above, beads prepared in accordance with certain embodiments of the present invention demonstrate an increase in resolution with an increase in the bead size, for beads with approximately the same ligand density. A demonstration of this is included in the examples below. This may mean that larger beads are more easily deformed than smaller beads upon compression of the bed, and therefore come closer to each other, favoring a faster transfer of solutes between the beads. The phenomenon may also involve an easier transition from laminar flow to secondary flow.

The examples will also demonstrate that for non-deformable (i.e., rigid) beads such as silica which are provided with a resilient polymer coating in accordance with the invention, the resolution in hydrophobic interaction chromatography remains high despite the use of a large bead size. This presents a particular advantage, since large diameter beads are easy and inexpensive to prepare, and can be given a rough size-sieving with no loss of resolution.

Other advantages of the invention as it is applied to silica beads include the fact that the procedure increases the pH stability of the beads and the fact that it eliminates the tendency of the beads to adsorb proteins. The polymer coating also facilitates derivatization when the polymers are rich in hydroxyl groups.

The following examples are offered for illustrative purposes only, and are intended neither to define nor to limit the invention in any manner.

CHROMATOGRAPHIC EQUIPMENT

An HPLC pump Model 2150, and LC controller Model 2152, a variable wavelength monitor Model 2141 and an integrator Model 2220 purchased from LKB (Bromma, Sweden); an integrator Model C-RIA purchased from Schimadzu Corp. (Kyoto, Japan; and an injector valve purchased from Rehodyne (Cotati, Calif., U.S.A.) were used.

MATERIALS

The following materials were used.

Glycidol (2,3-epoxy-1-propanol), allylglycidyl ether and 1,3-butadiene diepoxide obtained from Aldrich (Milwaukee, Wis., U.S.A.); glycidyl-trimethyl ammonium chloride (2,3-epoxypropyl-trimethyl ammonium chloride), divinyl sulfone (DVS) and N-methylolacrylamide from Fluka Chemie (Buchs, Switzerland); boron trifluoride diethyl etherate (BF₃) from Serva (Heidelberg, Federal Republic of Germany); γ-methacryloxypropyltrimethoxysilane from LKB (Bromma, Sweden); acrylamide, N,N,N',N'-tetramethylethylenediamine (TEMED), ammonium persulfate (electrophoresis purity reagent) and ammonium sulfate (HPLC grade) from Bio-Rad Laboratories, Inc. (Richmond, Calif., U.S.A.); silica beads LiChroprep® Si 100, diameter: 25–40 μm, pore size: 100 Å) and sodium borohydride (NaBH₄) from Merck (Darmstadt, FRG).

Horse skeletal muscle myoglobin, α-chymotrypsinogen A, lysozyme, cytochrome C, bovine serum albumin (BSA), insulin (A-chain), tetraglycin, ACTH and bradykinin were bought from Sigma (St. Louis, Mo. U.S.A.); hexylglycidyl ether, catalase, ferritin, thyroglobulin, ovalbumin, ribonuclease and dextran from Pharmacia AB (Uppsala, Sweden); Lactate dehydrogenase from Boehringer Manheim GmbH (Manheim, FRG); human transferrin and human serum albumin (HSA) from Dr. L.-O. Andersson (KABI, Stockholm, Sweden); human hemoglobin by hemolysis of outdated blood and phycoerythrin from *Ceramium rubrum* as described in Tiselius, A., et al., *Biochem. Biophys.* 65, 132 (1956). All other chemicals used were of analytical grade. Agarose beads (11%) were prepared by an emulsion-gelation technique described in Hjertén, S., *Biochem. Biophys. Acta* 79, 393 (1964).

EXAMPLE 1

Nonporous agarose beads were prepared from macroporous agarose beads with 1,4-butanediol diglycidyl ether crosslinking agent by the following procedure.

To shrink agarose beads, 5 g (about 5 mL) of sedimented 11% macroporous agarose beads of about 30 μm diameter were washed by centrifugations at 1.500×g for 1–2 minutes with the following solutions: 5 mL of deionized water; 5 mL of dioxane-water (1:1); two 5-mL portions of dioxane. The sedimented beads were suspended in 2.5 mL of dioxane-chloroform (1:1). With stirring, dioxane was added dropwise until the opalescent suspension became transparent. An additional 2.5 mL of dioxane was then added. Following stirring for 1 minute and centrifugation, the supernatant was removed and the beads were washed with five 5-mL portions of dioxane-chloroform (1:1). The shrunken beads were then washed with three 5-mL portions of chloroform and suspended in 20 mL of chloroform. By these washing procedures the size of the sedimented agarose beads was reduced to a diameter of about 20 μm.

To crosslink the shrunken agarose beads, a 3.2-mL portion of 1,4-butanediol diglycidyl ether was added with stirring to the above suspension of shrunken beads in chloroform, followed by dropwise addition during 10 min of 0.3 mL of boron trifluoride diethyl etherate diluted in 12 mL of chloroform. After stirring for 30 minutes in a covered beaker, the beads were washed several times, first with dioxane and then with water. To further increase their rigidity, the agarose beads were crosslinked again after transfer to chloroform by the following procedure: five 5-mL portions of dioxane; 5 mL of dioxane-chloroform (1:1); two 5-mL portions of carbon tetrachloride (this solvent has a high density and therefore facilitates flotation of the beads); and 5 mL of chloroform. The beads were suspended in 20 mL of chloroform and then crosslinked as described above. The following is a simplified scheme of the crosslinking reaction:

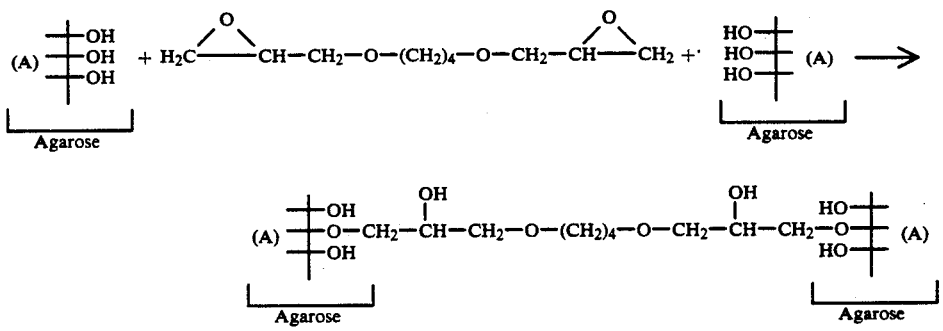

In this reaction, the 1,4-butanediol diglycidyl ether reacts with the OH groups in the agarose and gives ether bonds which are stable up to pH 14.

Upon shrinking and crosslinking, the volume of the sedimented macroporous beads was reduced from 5 mL to 1.5 mL of nonporous beads.

To enhance the hydrophilic character of the nonporous beads in a matrix for use in hydrophobic-interaction chromatography, the above crosslinked shrunken beads, with a volume of about 1.5 mL, were washed several times with dioxane by centrifugation at 1.500×g and then suspended in 10 mL of dioxane. Glycidol (1.5 mL) was added with stirring followed by 20 mL of boron trifluoride diethyl etherate. After stirring for 1 hour, the gel was washed by centrifugation for 2 minutes with six 5-mL portions of water. The volume of the sedimented beads was still about 1.5 mL.

EXAMPLE 2

This example illustrates the preparation of an anion exchanger by derivatization of nonporous agarose beads with dimethylamine. This example further illustrates the preparation of a column containing the derivatized beads, for use in ion exchange chromatography.

To enhance the hydrophilic character of the nonporous beads in a matrix for use in ion exchange chromatography, the shrunken, crosslinked agarose beads of Example 1, in the same volume, were treated with glycidol as described in that Example, except that three treatments with glycidol were used and 150 mL of the boron trifluoride diethyl etherate was diluted in 2 mL of dioxane prior to being added to the suspension of the agarose beads. The addition was performed slowly over a period of 5 minutes, with stirring. The sedimented volume of the beads after one treatment with glycidol was 1.5 mL and after three treatments was 3.5 mL.

Following the third treatment with glycidol, the agarose beads were washed by centrifugation with three 5-mL portions of dioxane and then suspended in 15 mL of dioxane. One mL of 1,4-butanediol diglycidyl ether was added slowly, with stirring, followed by 0.1 mL of boron trifluoride diethyl etherate. After activation of the beads for 30 minutes, 1 mL of dimethylamine was added and the stirring was continued for 20 hr at room temperature, to give 3-dimethylamino-2-hydroxypropyl agarose (DMAHP-agarose) beads.

The resulting beads were packed in deionized water into a Plexiglas column (interior diameter=0.6 mm) at a flow rate of 2 mL/min. The bed was then compressed about 3 mm to a height of 6.2 cm by increasing the flow rate to 5 mL/min.

EXAMPLE 3

This example demonstrates the porosity of the shrunken, crosslinked beads of Examples 1 and 2.

A. Porosity of beads of Example 1

Figure 1B:
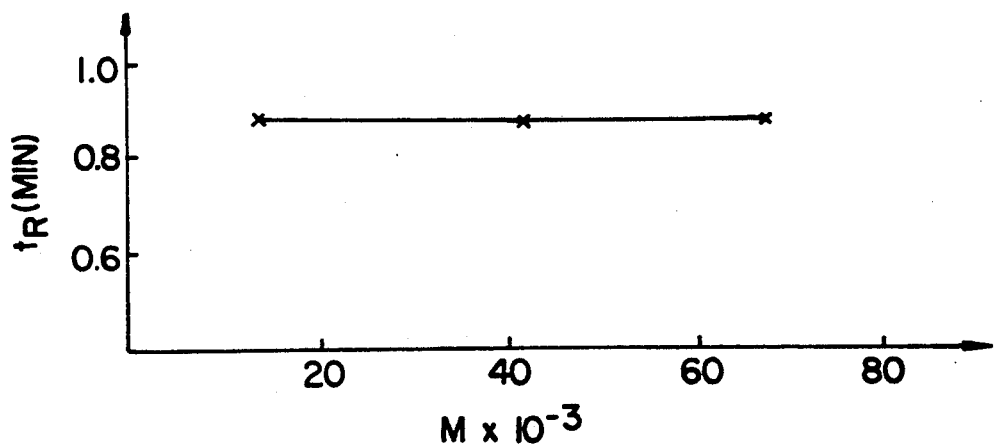

The porosity was studied by molecular-sieve chromatography on a 0.6 (i.d.)×7.2 cm column of the shrunken, crosslinked 20-μm beads of Example 1. After packing in water, the column was equilibrated with 0.01 M sodium phosphate, pH 6.8. The sample was applied, consisting of Blue Dextran (mol. wt. 2,000,000), phycoerythrin (290,000), human transferrin (80,000), bovine serum albumin (67,000), hen egg ovalbumin (43,000), horse heart cytochrome C (12,100) and potassium chromate (194). The retention times are plotted against the molecular weights in FIG. 1-a. It is evident from the results in the figure that the beads are impermeable (nonporous) to proteins, at least to those with molecular weights above 12,000.

B. Porosity of beads of Example 2

The ion exchange chromatography column prepared in Example 2 was equilibrated with 0.01M Tris-HCl, pH 8.5, containing 0.2M sodium acetate. A sample consisting of the proteins bovine serum albumin (mol. wt. 67,000), ovalbumin (chicken egg albumin) (43,000) and ribonuclease (13,600) was applied. The elution was performed with the same buffer (the proteins are not adsorbed in this buffer). The retention times of the proteins are plotted against their molecular weights in FIG. 1-b. It is evident from the results in the figure that the beads are impermeable (nonporous) to proteins with molecular weights above 12,000.

EXAMPLE 4

Nonporous agarose beads were prepared from macroporous agarose beads by crosslinking with γ-glycidoxypropyltrimethoxy silane according to the following procedure.

Following the procedure of Example 1, 15% macroporous agarose beads with diameters in the range of 15-70 μm were collected, and the water in the beads was exchanged for dioxane. Upon washing with a mixture of dioxane and chloroform the volume of sedimented beads decreased by about 65%, with the diameters of the shrunken beads being 10-50 μm.

To crosslink the shrunken agarose beads, γ-glycidoxypropyltrimethoxysilane was added with stirring to the above suspension of shrunken beads in chloroform, followed by dropwise addition of stannic chloride diluted in chloroform over ten minutes. After stirring for 30 minutes in a covered beaker, the beads were washed several times, first with dioxane and then with water. A simplified crosslinking reaction scheme is shown below:

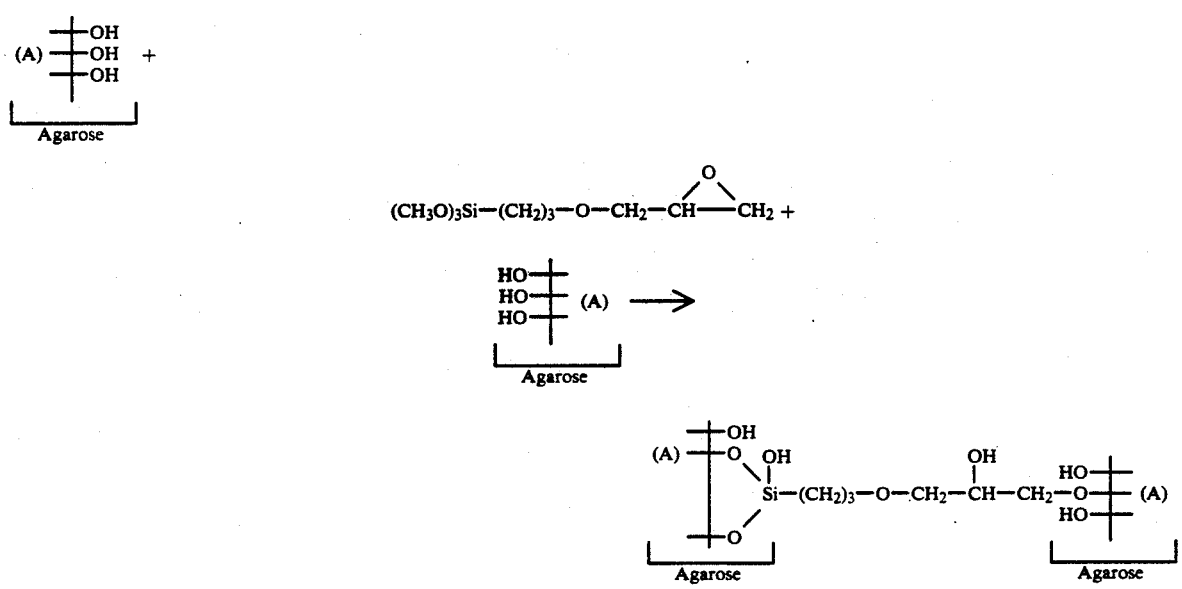

The resulting beads were impenetrable by cytochrome C (mol. wt. 12,400) as evidenced by a molecular-sieve chromatography experiment.

EXAMPLE 5

This example demonstrates the preparation of nonporous agarose beads by treatment with glycidol only.

Sedimented, macroporous 11% agarose beads (1.5 g, 20 μm diameter) were washed twice with water, followed by centrifugation at 1500×g for 5 minutes. The gel beads were then transferred to dioxane by three washings with 5-mL portions of dioxane. The beads were then suspended in 10 mL of dioxane. Glycidol (1.5 mL) was then added with stirring, followed by 200 μL of BF₃ (added dropwise). The stirring was continued for 1 hour. The beads were then washed 6 times with 5-mL portions of water by repeated centrifugations. The glycidol treatment was then repeated three times. As a result of the treatments, the bead size increased from 10-20 μm to 20-30 μm.

Figure 2:
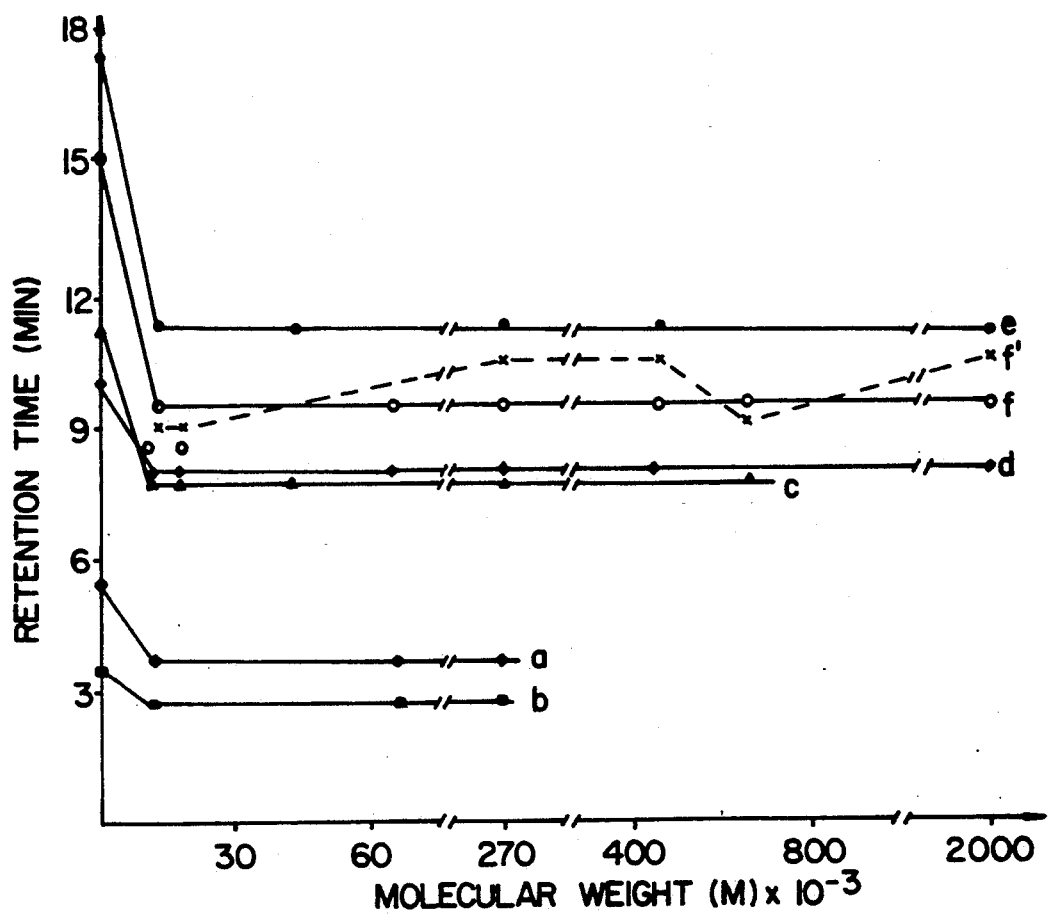
FIG. 2 is a plot of retention time vs. molecular weight of solutes using nonporous agarose beads. This is an indication of bead porosity.

To determine the porosity of the beads, a 6×150 mm column was packed with the beads in water and equilibrated with 0.03M sodium phosphate buffer (pH 6.8). Proteins with different molecular weights (potassium chromate, mol. wt. 4; cytochrome C, mol. wt. 12,100; BSA, mol. wt. 67,000; and phycoerythrin, mol. wt. 270,000) were then applied. The latter three eluted in the same volume whereas the potassium chromate was eluted later. These results are shown in FIG. 2 as line b. The beads were thus determined to be nonporous for proteins with molecular weights above 12,000.

To investigate the hydrophilicity of the beads, the same column was equilibrated with 0.01M sodium phosphate buffer (pH 6.8) containing 2.1M ammonium sulfate. HSA and phycoerythrin were then run separately. Both eluted at the void volume, which indicates that the beads were hydrophilic.

EXAMPLE 6

This example demonstrates the preparation of nonporous agarose beads by treatment with allylglycidyl ether and acrylamide.

Figure 3:
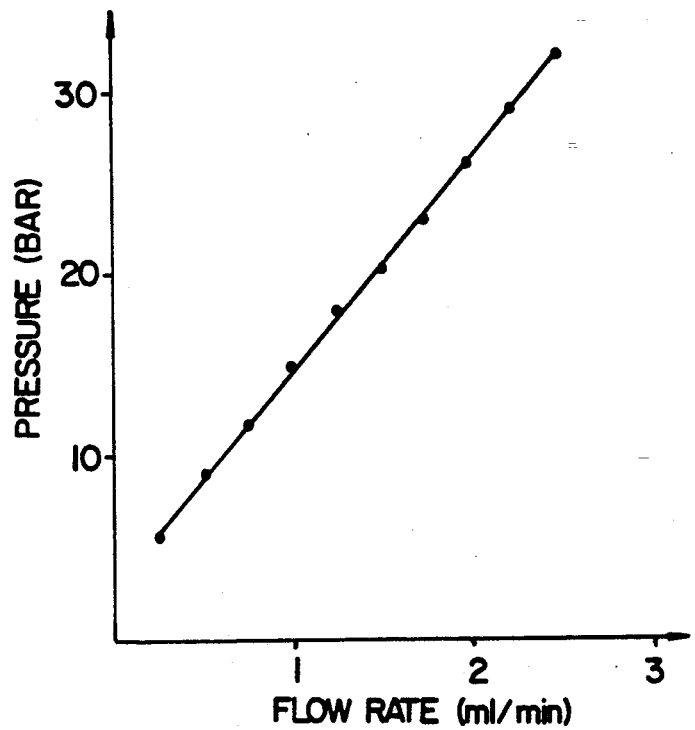
FIG. 3 is a plot of the effect of pressure on flow rate for nonporous agarose beads.

Agarose beads (12%, 5 g, diameter: 40-60 μm), in which the water had been replaced with dioxane as described in the preceding example, were suspended in 20 mL of dioxane and mixed with 5 mL of allylglycidyl ether and 0.4 mL of $BF_3$ in 2 mL of dioxane. After a reaction time of one hour, the beads were washed in water in a centrifuge tube, then suspended in 10 mL of a 15% (w/v) solution of acrylamide. After deaeration, 40 mg of ammonium persulfate was added, followed by 15 μL of TEMED. The centrifuge tube, covered with a lid, was rotated for one hour, after which the beads were washed repeatedly with distilled water. The pressure-flow rate dependence of these non-cross-linked beads is shown in FIG. 3.

EXAMPLE 7

This example demonstrates the synthesis of octyl and pentyl hydrophobic interactors and the packing of columns for use in hydrophobic interaction chromatography.

To the shrunken, crosslinked agarose beads of Example 4, after the final wash with dioxane, was added octanol, and the reaction was allowed to proceed for 25 minutes. The beads were then washed several times with dioxane and then with water to give octyl agarose nonporous beads. Pentyl agarose beads were prepared in the same manner by reaction with pentanol.

The packing of each of the pentyl and octyl agarose columns was performed in a Plexiglas column tube with 0.6 cm interior diameter in distilled water at a pressure of a few bars, after which the pressure was increased to 25 bar, to compress the bed. The plunger of the column tube was then pressed down onto the surface of the bed. This precompression eliminated shrinkage of the bed at high flow rates.

EXAMPLE 8

This example demonstrates the high mass recovery efficiency of the nonporous beads of the invention.

A. With hydrophobic interaction chromatographic (HIC) column of Example 3-A

A packed column containing beads of Example 1 is prepared as in Example 3-A. The column is equilibrated with 0.01M sodium phosphate (pH 6.8) containing 2.1M ammonium sulfate. Bovine pancreas ribonuclease A (100 mg) dissolved in 50 mL of the equilibration buffer was applied. Desorption was achieved with 0.01M sodium phosphate (pH 6.8). Measurements of the absorption at 280 nm of the applied sample and the collected fractions indicated a recovery of 100%.

The experiment was repeated with hen egg ovalbumin and bovine liver catalase. The recoveries were 99% and 98%, respectively.

B. With ion exchange chromatographic column of Example 2.

An ion exchange column prepared as in Example 2 was equilibrated with 0.01M Tris-HCl, pH 8.5. The proteins ovalbumin, hemoglobin and transferrin were adsorbed in the equilibrium buffer 0.01M Tris-HCl (pH 8.5) and eluted with buffer containing 0.2M sodium acetate. Measurements of absorption at 280 nm of both the applied sample and the eluted fractions indicated recoveries of 96%, 96% and 105%, respectively.

EXAMPLE 9

This example demonstrates the pressure-flow rate dependence of the nonporous beads of the invention, the results of which indicate that these beads permit flow rates higher than 4 mL/min.

A. With HIC column of Example 3-A An equilibration buffer (0.01M sodium phosphate, pH 6.8, containing 2.1M ammonium sulfate) was passed through a column, prepared as in Example 3-A, at the flow rates 0.25, 0.50, 1.0, 2.0, 3.0 and 4.0 mL/min. The pressures were read and plotted against the flow rates. The results indicate that the column can be operated at flow rates above 4 mL/min.

B. With ion exchange column of Example 2

An equilibration buffer (0.01M Tris-HCl, pH 8.5) was passed through a column, prepared as in Example 2, at flow rates in the range of 1-5 mL/min at increments of 0.5 mL/min. For each flow rate, the pressure was read and plotted against the flow rate. The results indicate that the column can be operated at flow rates above 5 mL/min.

EXAMPLE 10

This example shows the influence of the flow rate at constant gradient volume on the appearance of the chromatograms, demonstrating that the resolution either remains about the same or increases with the flow rate.

A. With HIC column of Example 3

Figure 4:
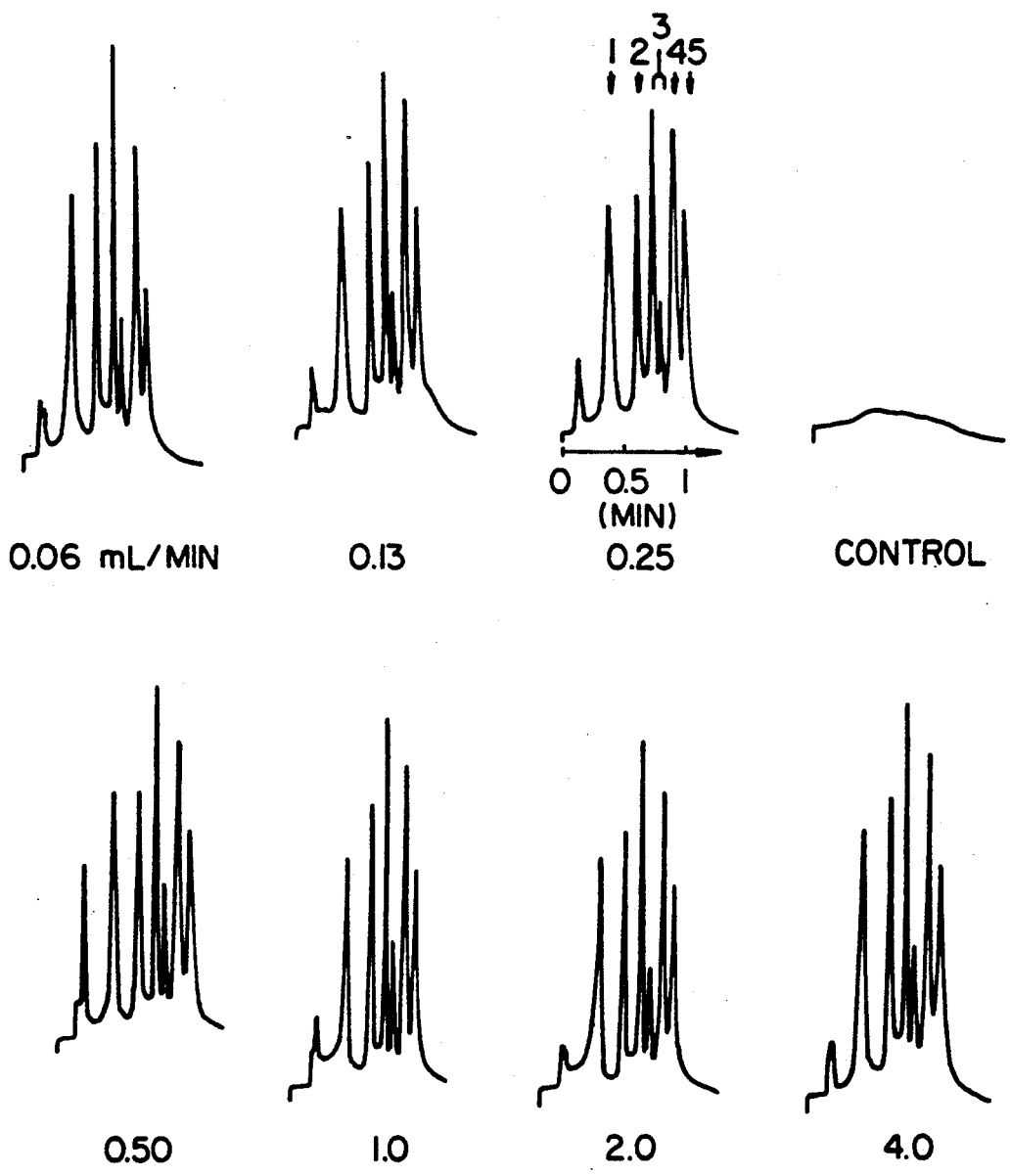
FIGS. 4, 5 and 6 are chromatograms showing the influence of the flow rate at constant gradient volume on the appearance of the chromatograms.

The column was equilibrated with 0.01M sodium phosphate (pH 6.8) containing 2.1M ammonium sulfate. The sample (3-6 mg of each of the proteins ribonuclease, ovalbumin, α-chymotrypsinogen A, catalase and ferritin) dissolved in 40 mL of the equilibration buffer was applied. At a flow rate of 0.06 mL/min the elution was achieved with a linear negative salt gradient formed from the equilibration buffer and 0.01M sodium phosphate (pH 6.8) containing 0.25M ammonium sulfate (pH 6.8). The experiment was repeated at flow rates of 0.13, 0.25, 0.5, 1.0, 2.0 and 4.0 mL/min. The gradient volume was 3.2 mL in all experiments. The recorder chart speed was increased proportionally to the increase in flow rate to give all the chromatograms the same width, thereby facilitating direct visual comparison. The results are shown in FIG. 4. The figure shows that the protein pattern and the resolution are about the same at low and high flow rates.

B. With ion exchange column of Example 2

Figure 5:
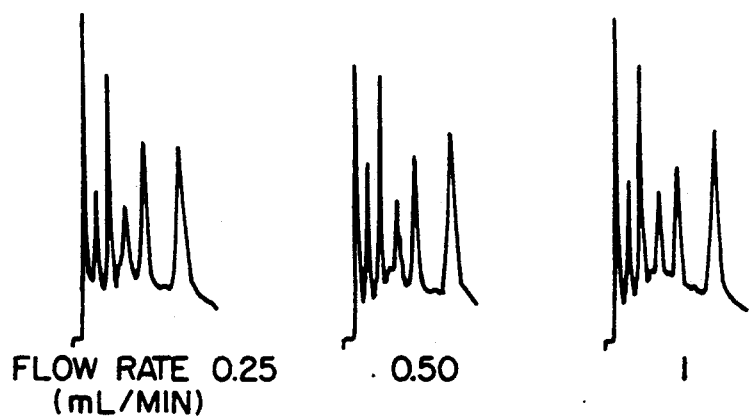
Figure 5:
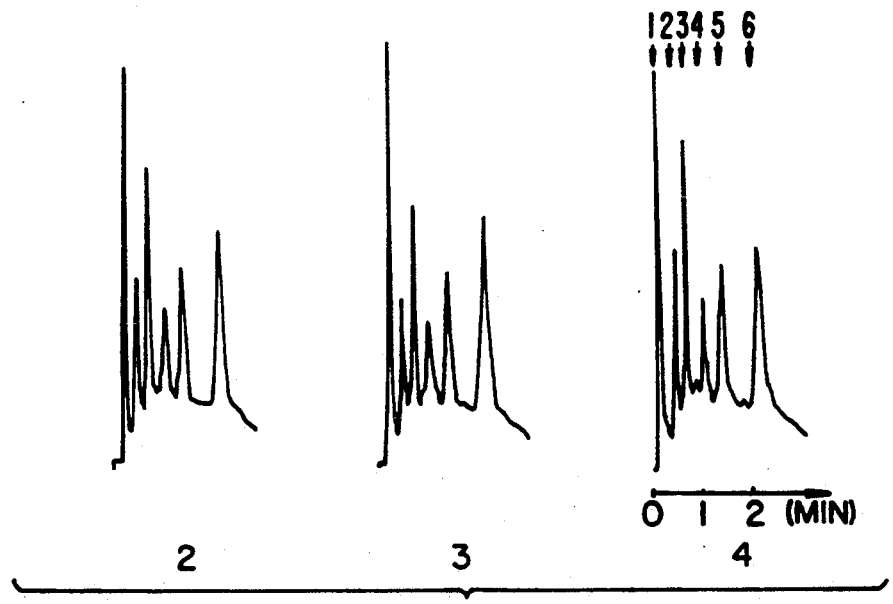

The column was equilibrated with 0.01M Tris-HCl (pH 8.5). The sample (20–40 mg each of the proteins myoglobin, hemoglobin, transferrin, ovalbumin, albumin, and phycoerythrin) was dissolved in 20 mL of the equilibration buffer and applied to the column. Elution was achieved with a linear salt gradient generated from the equilibration buffer and 0.01M Tris-HCl (pH 8.5) containing 0.18M sodium acetate. A series of experiments was performed at flow rates from 0.25 mL/min to 4.0 mL/min. The gradient volume was constant, 10.0 mL, in all experiments. The chart speed was in each experiment proportional to the flow rate to give chromatograms of the same width. The results are shown in FIG. 5. The figure shows that the protein pattern and the resolution are about the same at low and high flow rates.

C. With HIC column on octyl agarose beads of Example 7

Figure 6:
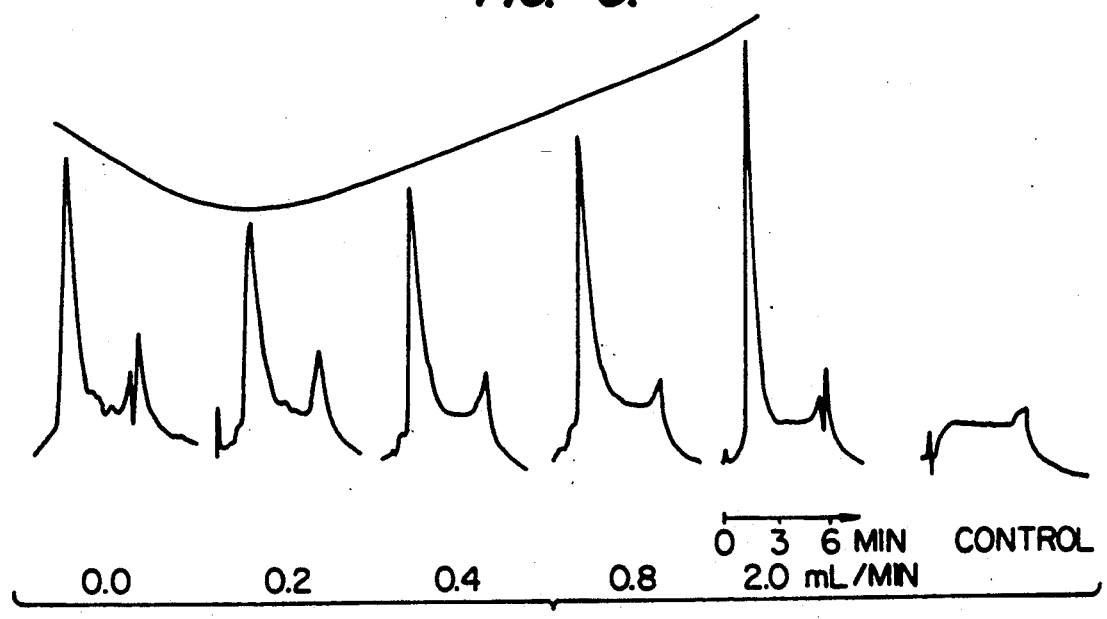

The octyl agarose beads of Example 7 were packed into a column, the bed having the dimensions 0.6 (i.d.) cm × 4.7 cm. The packing was performed as in Example 7 so that the bed height did not decrease as the flow rate was increased. The column was equilibrated with 0.01M sodium phosphate (pH 7.0) containing 2M ammonium sulfate. The sample (1.5 mL of a 0.4% (w/v) solution of human transferrin) was eluted with a 10 mL gradient formed by this buffer and the same buffer without ammonium sulfate. The flow rates were 0.08, 0.2, 0.4, 0.8 and 2.0 mL/min (pressure <1, <1, <1, 3 and 16 bar) and the chart speeds of the recorder were proportional to the flow rates. The chromatograms are shown in FIG. 6, which shows that the resolution increases with the flow rate.

EXAMPLE 11

This example demonstrates the resolution on columns of compressed, nonporous agarose beads as a function of flow rate at constant gradient volume, illustrating that the resolution varies only slightly with the flow rate.

A. With HIC column of Example 3-A

Figure 7A:
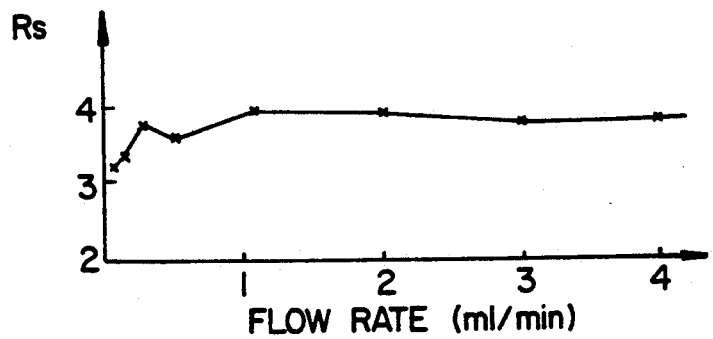
FIGS. 7A and 7B show the resolution ($R_s$) of samples as a function of flow rate at constant gradient volume.
Figure 7B:
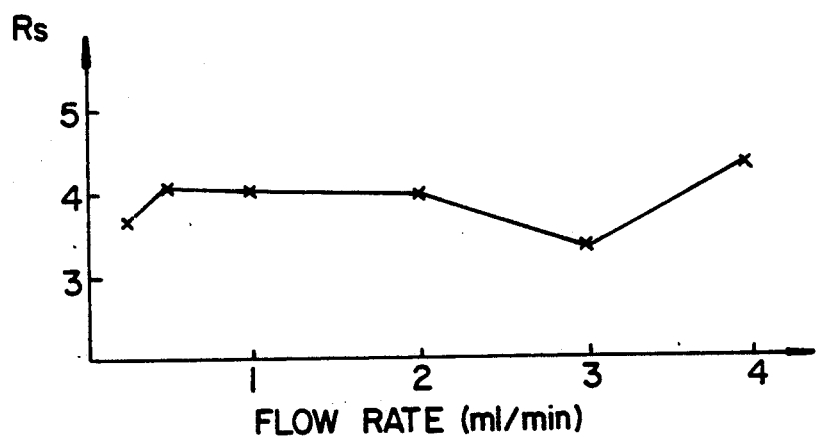

The experimental conditions were similar to those described in Example 9-A, except for the bed height which was 2.5 cm. The sample consisted of ovalbumin and α-chymotrypsinogen A. The resolution between these two proteins was calculated for different flow rates from the following equation:

$$R_s = \frac{t_2 - t_1}{0.5(t_{w2} + t_{w1})} \quad (I)$$

where $t_1$ and $t_2$ are the retention times for ovalbumin and α-chymotrypsinogen A, respectively, and $t_{w1}$ and $t_{w2}$ are their peak widths at half the peak heights. FIG. 7-a is a plot of resolution vs. flow rate and indicates that the resolution varies only slightly with the flow rate.

B. With ion exchange column of Example 2

The experimental conditions were similar to those described in Example 9-B. The sample consisted of hemoglobin and transferrin. The resolution at different flow rates was calculated using the above equation (I) except that the values for hemoglobin and transferrin are inserted in place of those for ovalbumin and α-chymotrypsinogen A, respectively. FIG. 7-b is a plot of resolution vs. flow rate and indicates that the resolution varies only slightly with the flow rate.

EXAMPLE 12

This example demonstrates the preparation of nonporous agarose beads derivatized with polyethyleneimine, and their use in chromatofocusing.

Nonporous 15–20 μm agarose beads (agarose concentration prior to shrinkage was 11%) crosslinked with γ-glycidoxypropyltrimethoxy silane were derivatized with polyethyleneimine, following procedures described in Yao, et al., pu J. Chromatog. 385, 87 (1987). This ion exchanger was packed in a Plexiglas column (i.d.=0.6 cm) at a flow rate of 2 mL/min. The plunger was pressed down in order to compress the column 3–4 mm. The bed, the height of which was now 3.0 cm, was equilibrated with 0.025M bis(2-hydroxyethyl)iminotris(hydroxymethyl)methane (BIS-TRIS) adjusted to pH 6.5 with hydrochloric acid (starting buffer).

Figure 8:
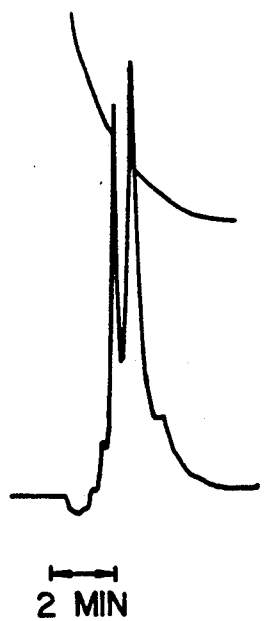
FIG. 8 shows a chromatogram which is the result of a chromatofocusing experiment.

A sample consisting of 0.5 mg of human transferrin dissolved in 0.1 mL of the starting buffer was applied. The elution was performed at a flow rate of 4.8 mL/min with Polybuffer 74 TM (Pharmacia AB, Sweden) diluted 1:80 with deionized water. Monitoring at 280 nm gave the chromatogram shown in FIG. 8. The experiment was finished within 5 minutes.

The results indicate that the compressed, nonporous beads permit a high resolution at run times shorter than those normally used in chromatofocusing when only porous beads have been used. Also, only 2–4 bed volumes of the starting buffer were required for equilibration, in this experiment corresponding to about 1 minute. Columns of porous beads required about 10–15 bed volumes.

EXAMPLE 13

This example demonstrates the synthesis of nonporous, nonshrunken agarose beads by reaction with glycidol and DVS crosslinking agent, and the use of such beads in the preparation of HIC columns.

1.5 Grams of 11% sedimented porous agarose beads were washed twice with water by centrifugation at 1500×g for 5 minutes. The beads were transferred and washed with dioxane five times (5-mL portions). The beads were then suspended in 10 mL of dioxane, and 1.5 mL of glycidol was added with stirring, followed by 100 mL of boron trifluoride (added dropwise). Stirring was continued for 1 hour, after which the beads were washed six times with 5-mL portions of water by repeated centrifugations. This coupling with glycidol was repeated three times as described above. The bead size increased from 10–20 μm to 20–30 μm after glycidol derivatization.

To test the porosity of the beads, a column was packed (6×150 mm) with beads prepared as above in water and equilibrated with 0.01M sodium phosphate buffer (pH 6.8) containing 2.1M ammonium sulfate. The proteins bovine serum albumin (mol. wt. 67,000) and phycoerythrin (270,000) were run separately and both eluted in the void volume. The beads were thus hydrophilic and nonporous.

The nonporous glycidol-derivatized agarose beads prepared as above were crosslinked with DVS according to the procedure of Hjertén, S., et al., J. Chromatog. 396, 10 (1987). To increase the hydrophobicity of the beads, they were treated once more with divinyl sulphone, this time without mannitol treatment.

To prepare the HIC column, a Plexiglas column (6 mm i.d.) was packed with the above glycidol- and DVS-derivatized beads in distilled water at constant pressure (45 bar) and compressed with the aid of the movable plunger. The bed dimensions were 6-48 mm. If not stated otherwise in the following experiments, proteins were eluted with a 3.2 mL linear negative salt gradient (from 3M ammonium sulfate to 0.2M ammonium sulfate) in a 0.01M sodium phosphate buffer (pH 6.8).

EXAMPLE 14

Figure 9:
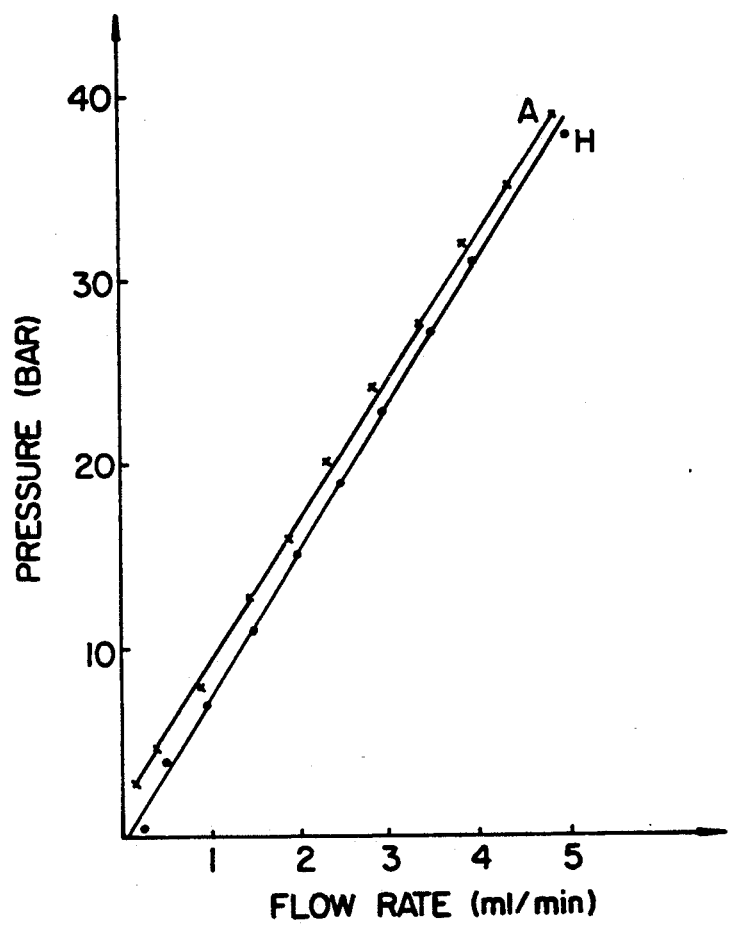
FIG. 9 is a plot showing the effect of pressure on flow rate for a nonporous agarose-based anion exchange column and a nonporous agarose-based hydrophobic interaction column.

Agarose beads derivatized with glycidol and divinyl sulfone as described in the preceding example were sized by elutriation into three fractions (5-10 μm, 20-30 μm and 50-60 μm), which were packed individually into three columns. A sample consisting of a mixture of o-chymotrypsinogen and ferritin was used to test each of the columns, with 0.01M sodium phosphate buffer at pH 6.8. The resolution of the proteins in each case was calculated using Equation I above, and the results are shown in the plot in FIG. 9, which indicates that the resolution increases with increasing bead size.

The conclusion that the resolution increases with increasing bead size is correct only if the effective ligand density is the same for the beads in the three columns. The effective ligand densities would indeed be expected to be the same, since the three fractions originated from the same batch of amphiphilic beads (i.e., the derivatization to render the beads amphiphilic was not done on separate fractions of sized beads).

To verify experimentally that the ligand densities did not differ among the three columns, retention times were compared using isocratic elutions. It is known that retention times in isocratic elutions of macromolecules with multipoint attachments are strongly dependent on the ligand density of the matrix. Ferritin was used as a test substance due to its high molecular weight (440,000), and the retention time was measured in 0.01M sodium phosphate, pH 6.8 (generating no hydrophobic interaction), and in the same buffer containing 0.45M ammonium sulfate (generating a hydrophobic interaction). With the former designated as $t_0$ and the latter as $t_r$, the ratio $t_r/t_0$ was 1.5, 1.3 and 1.5 for the bead diameters 5-10 μm, 20-30 μm and 50-60 μm, respectively. The relatively small differences observed support the view that the ligand density was the same for the beads of different diameters. If the ligand density had varied with bead size, the relationship would have been monotonic. The observed nonmonotonic character confirms the conclusion that the resolution increased with, or at least did not decrease with, an increase in bead size.

EXAMPLE 15

This example demonstrates the synthesis of nonporous nonshrunken trimethylamino-2-hydroxypropyl-agarose (TMAHP-agarose) beads and preparation of an ion exchanger.

Five grams of 11% porous agarose beads (average diameter=20 μm) were washed twice with distilled water by repeated centrifugations at 1500×g for 5 minutes, and were then crosslinked with DVS as described by Hjertén, S., et al., J. Chromatog. 396, 10 (1987), with the modification that mannitol was substituted by 2 g of a mixture of equal amounts of Dextran T 10, T 40 and T 500. The crosslinked agarose beads were washed with two 5-mL portions of distilled water and then with three 5-mL portions of dioxane. The beads were suspended in 20 mL of dioxane. Glycidol (5 mL) was then added with stirring, followed by 0.5 mL of boron trifluoride (the catalyst was added dropwise and slowly over 5 minutes to prevent aggregation of the beads). The stirring was continued for 1 hour. The beads were then washed five times with 5-mL portions of distilled water. The diameter of the now-nonporous beads following derivatization remained at 20 μm.

To investigate the porosity of the beads, a column was packed (6×150 mm) with the above beads in water and equilibrated with 0.03M sodium phosphate buffer (pH 6.8). Proteins with different molecular weights (potassium chromate, mol. wt. 194; cytochrome C, 12,100; bovine serum albumin, 67,000; and phycoerythrin, 270,000) were applied. The cytochrome C, bovine serum albumin and phycoerythrin all eluted in the same volume, while the potassium chromate was eluted later. Thus, the beads were nonporous at least for proteins with molecular weights above 12,000.

To couple glycidyl trimethylammonium chloride to the above nonporous beads, the following reaction scheme was used:

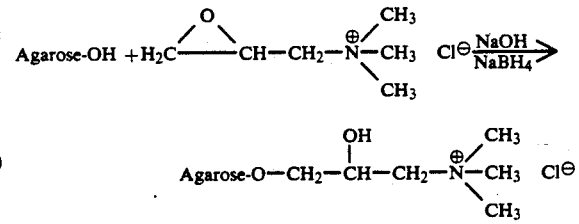

According to this reaction scheme, 2 g of sedimented nonporous beads were suspended in 2 mL of 0.5M sodium hydroxide solution containing 40 mg of sodium borohydride. Glycidyl trimethyl ammonium chloride (6 g) was added with stirring and the stirring was continued for 4 hours. The beads were then washed with distilled water by centrifugation at 1500×g until the supernatant had a pH of 7-8, to give trimethylamino-2-hydroxypropyl-agarose beads.

To prepare the anion exchanger, a Plexiglas column was packed with (TMAHP)-agarose beads in distilled water at a flow rate of 5 mL/min. The bed was compressed with the aid of the movable plunger. The bed dimensions were then 6×57 mm. If not stated otherwise, in the following experiments proteins were eluted with a 10-mL linear salt gradient (from 0.015M sodium acetate to 0.27M sodium acetate) in a 0.01M Tris-HCl buffer (pH 8.5).

EXAMPLE 16

This example demonstrates the pressure-flow rate dependence of the nonporous TMAHP-agarose beads of the preceding Example, the results of which indicate that these beads permit high flow rates of at least 5 mL/min for a column of 6 mm interior diameter.

A. With HIC column of Example 13

Figure 10:
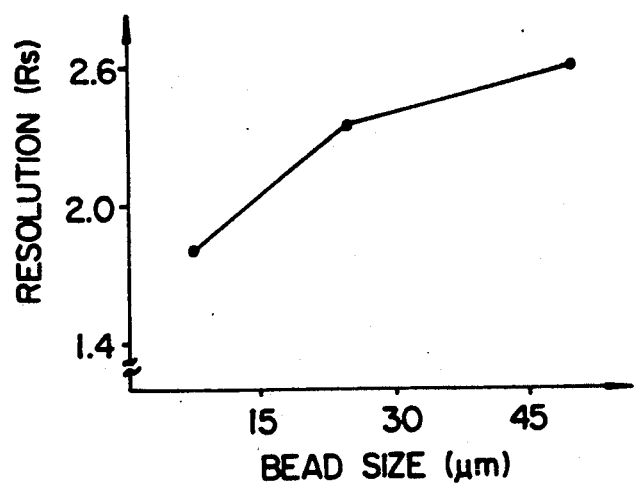
FIG. 10 is a plot of resolution vs. bead size for nonporous agarose beads adapted for use in a hydrophobic interaction column.

An equilibration buffer (0.01M sodium phosphate, pH 6.8) was passed through the column at different flow rates ranging from 0.25 up to 5.0 mL/min. The back pressure was measured and plotted against flow rate. The plot is shown in FIG. 10 as line H. The line indicates that the pressure increases linearly with the flow rate and that the column can be operated at flow rates at least to 5 mL/min.

B. with anion exchange column of Example 15.

An equilibration buffer (0.01M Tris-HCl, pH 8.5) was passed through the column at different flow rates ranging from 0.25 to 5.0 mL/min. The back pressure was measured and plotted against flow rate. The plot is shown in FIG. 10 as line A. The linearity of the plot even at the highest flow rates indicated a high rigidity of the beads and that the column can be operated at flow rates of 5 mL/min and higher.

EXAMPLE 17

This example demonstrates the resolution on columns of compressed, nonporous agarose beads as a function of flow rate at constant gradient volume, illustrating that the resolution is almost constant at different flow rates.

A. With anion exchange column of Example 15

Figure 11A:
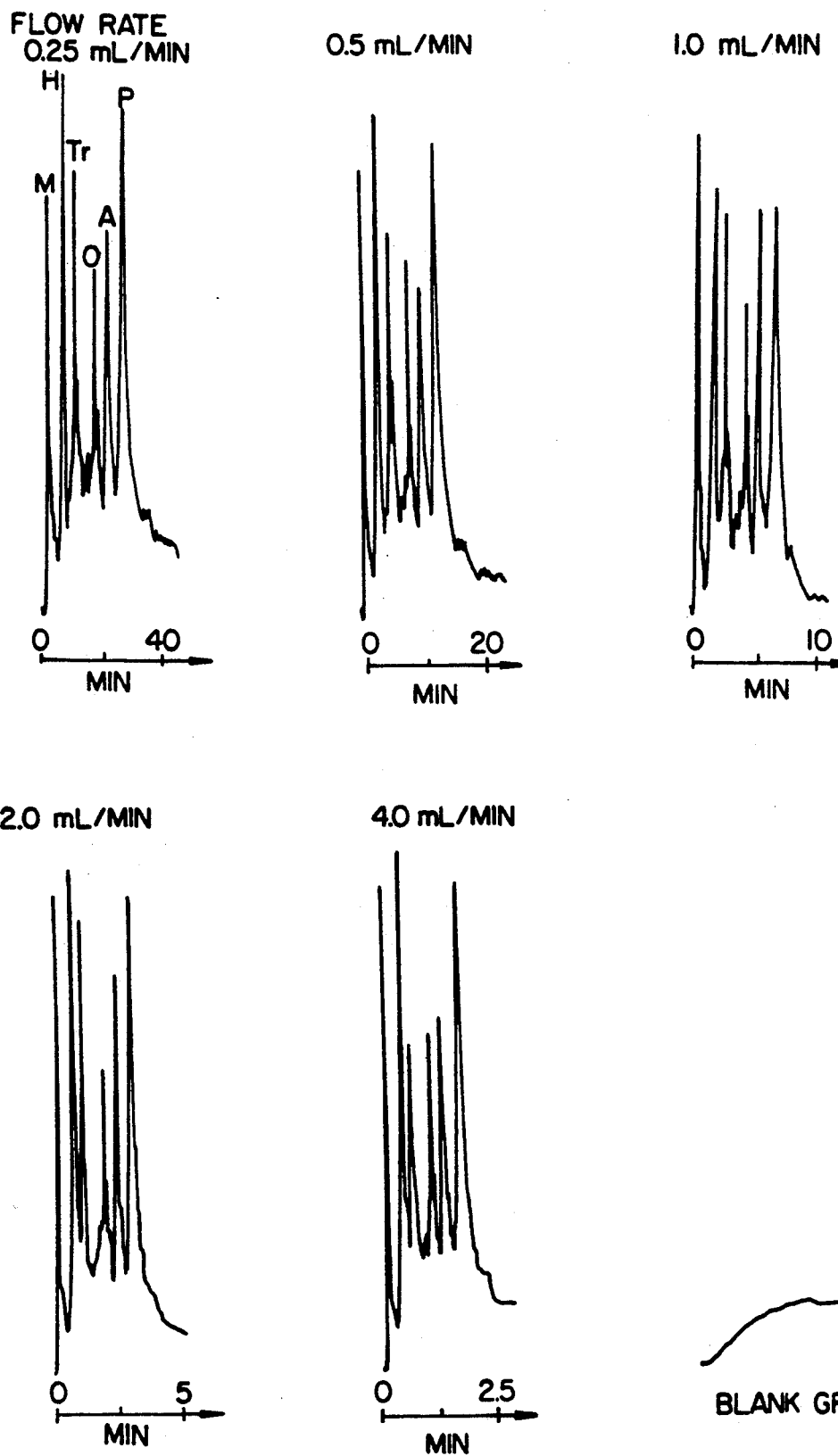
FIGS. 11-$a$ and 11-$b$ are plots of chromatograms using nonporous agarose beads in anion exchange and hydrophobic interaction chromatography, respectively, at various flow rates.
Figure 11B:
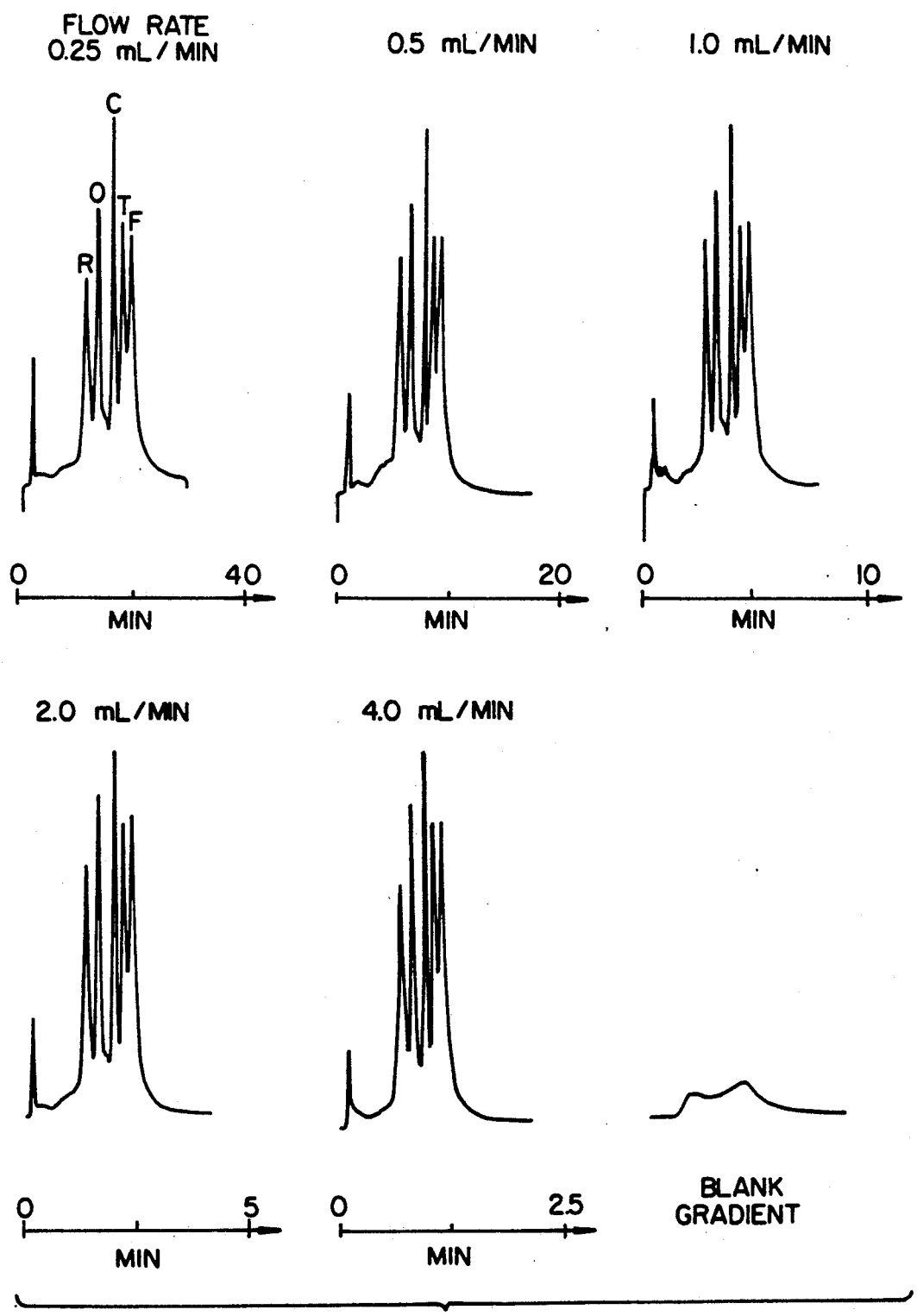
Figure 12:
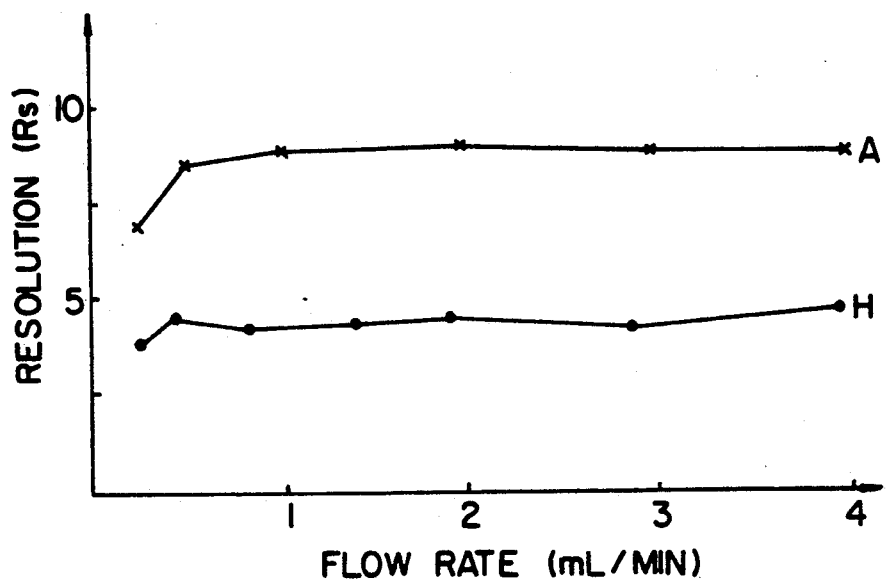
FIG. 12 is a plot of resolution vs. flow rate for nonporous agarose beads in both anion exchange and hydrophobic interaction chromatography.

The column of compressed TMAHP-agarose beads was used to separate a mixture (20 μL, 40 g) of myoglobin, hemoglobin, transferrin, ovalbumin, bovine serum albumin and phycoerythrin at constant gradient volume (10 mL) and flow rates of 0.25, 0.5, 1.0, 2.0 and 4.0 mL/min. The chromatograms are shown in FIG. 11-a. The resolution was calculated for hemoglobin and bovine serum albumin using Equation I. FIG. 12, line A, shows a plot of resolution against flow rate and indicates that the resolution is almost constant at different flow rates.

B. With HIC column of Example 13

Using the column of compressed glycidol- and DVS-treated agarose beads, a mixture (25 μL, 50 μg) of ribonuclease, ovalbumin, α-chymotrypsinogen, thyroglobulin and ferritin was separated at constant gradient volume (3.2 mL) and flow rates of 0.25, 0.5, 1.0, 2.0 and 4.0 mL/min. The chromatograms are shown in FIG. 11-b. The resolution was calculated for ovalbumin and o-chymotrypsinogen using Equation I. FIG. 12, line H, shows a plot of resolution against flow rate and indicates that the resolution is almost constant at different flow rates.

EXAMPLE 18

This example demonstrates the resolution on columns of compressed, nonporous agarose beads as a function of gradient time at constant flow rate and illustrates that resolution increases with gradient time, up to about 20 minutes, after which resolution becomes constant.

A. With HIC column of Example 1

Figure 13:
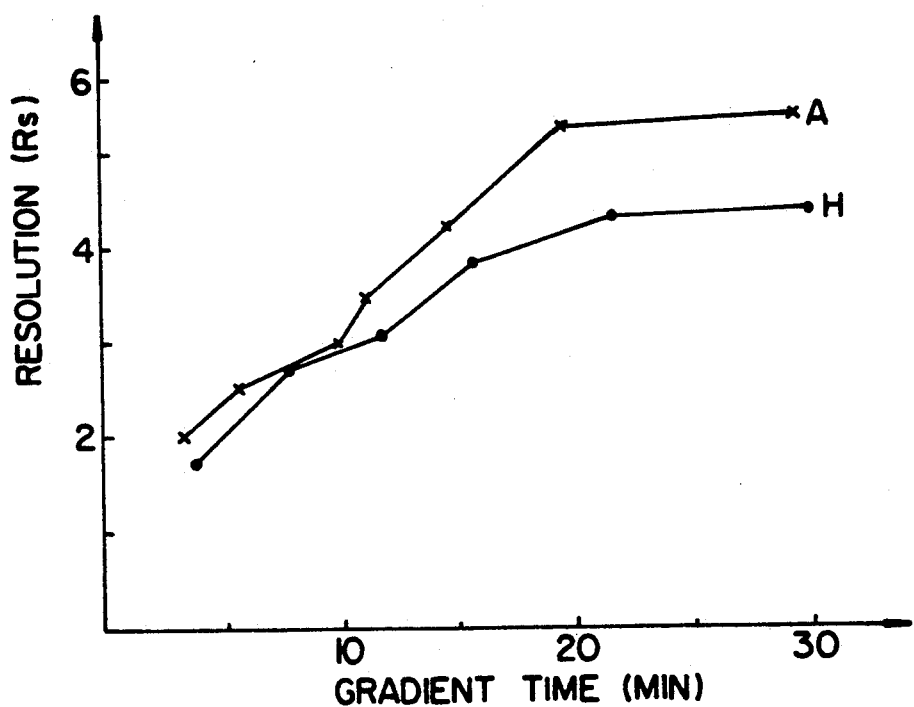
FIG. 13 is a plot of resolution vs. gradient time for nonporous agarose beads in both anion exchange and hydrophobic interaction chromatography.

The column of glycidol- and DVS-treated agarose beads was used to run a sample (15 μL) containing lysozyme (30 g) and transferrin (60 μg) at a constant flow rate of 1 mL/min and at different gradient times. The resolution was calculated, using Equation I, and plotted against gradient time (4–30 min). FIG. 13, line H, shows an increase in resolution with gradient time, up to around 20 minutes, after which a plateau value is reached.

B. With anion exchange column of Example 15

The column of compressed TMAHP-agarose beads was used to run a sample of hemoglobin (2 g) and ovalbumin (10 μg) at a constant flow rate of 1 mL/min and at different gradient times. The resolution was calculated using Equation I, and plotted against gradient time (3–30 min). FIG. 13, line A, shows that the highest (and constant) resolution is obtained for gradient times at or above 20 minutes.

EXAMPLE 19

This example demonstrates the resolution on columns of compressed, nonporous filled agarose beads as a function of sample load.

A. With HIC column of Example 13

A mixture of lysozyme and transferrin was used as sample (the concentration of transferrin was double that of lysozyme). Volumes between 5 and 60 μL were injected, corresponding to a total amount of 30 to 360 μg. Elution was achieved with a 3.2-mL gradient volume at a constant flow rate of 2 mL/min. The resolution was calculated using Equation I, and plotted against sample load and presented in FIG. 14, line H. The figure shows a decrease in resolution with increasing sample load, although the resolution is still satisfactory at the highest amount of proteins (360 μg).

B. The anion exchange column of Example 1

Figure 14:
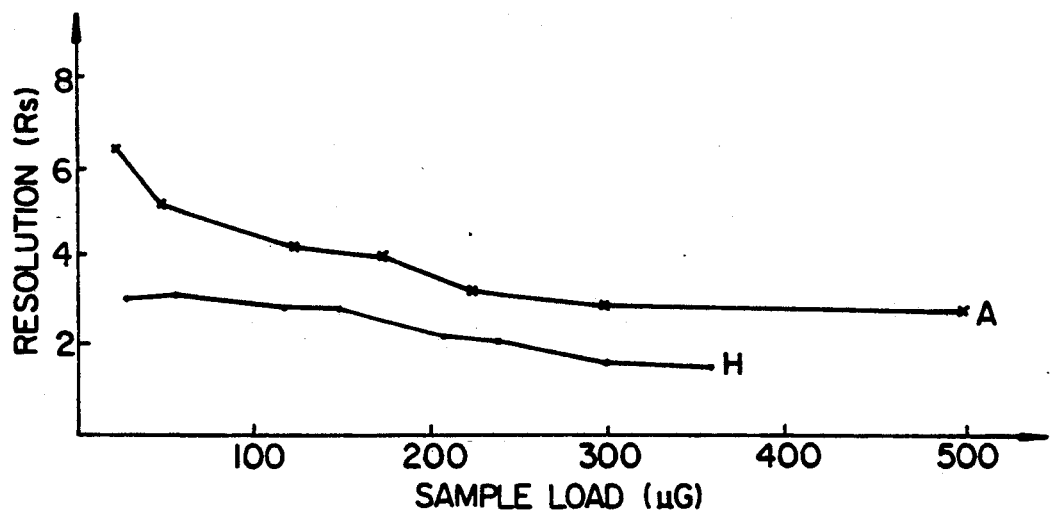
FIG. 14 is a plot of resolution vs. sample load for nonporous agarose beads in both anion exchange and hydrophobic interaction chromatography.

A mixture of ovalbumin and transferrin (the concentration of ovalbumin being double that of transferrin) was applied to the column and eluted with 10 mL gradient volume at a constant flow rate of 1 mL/min. The resolution of the proteins was determined according to Equation I, and plotted against the amount of sample applied. FIG. 14, line A, shows a decrease in resolution with increasing sample load up to 300 μg, after which the resolution is almost constant.

EXAMPLE 20

This example demonstrates the peak width as a function of flow rate for an HIC column packed with compressed nonporous agarose beads derivatized with glycidol and DVS.

Figure 15:
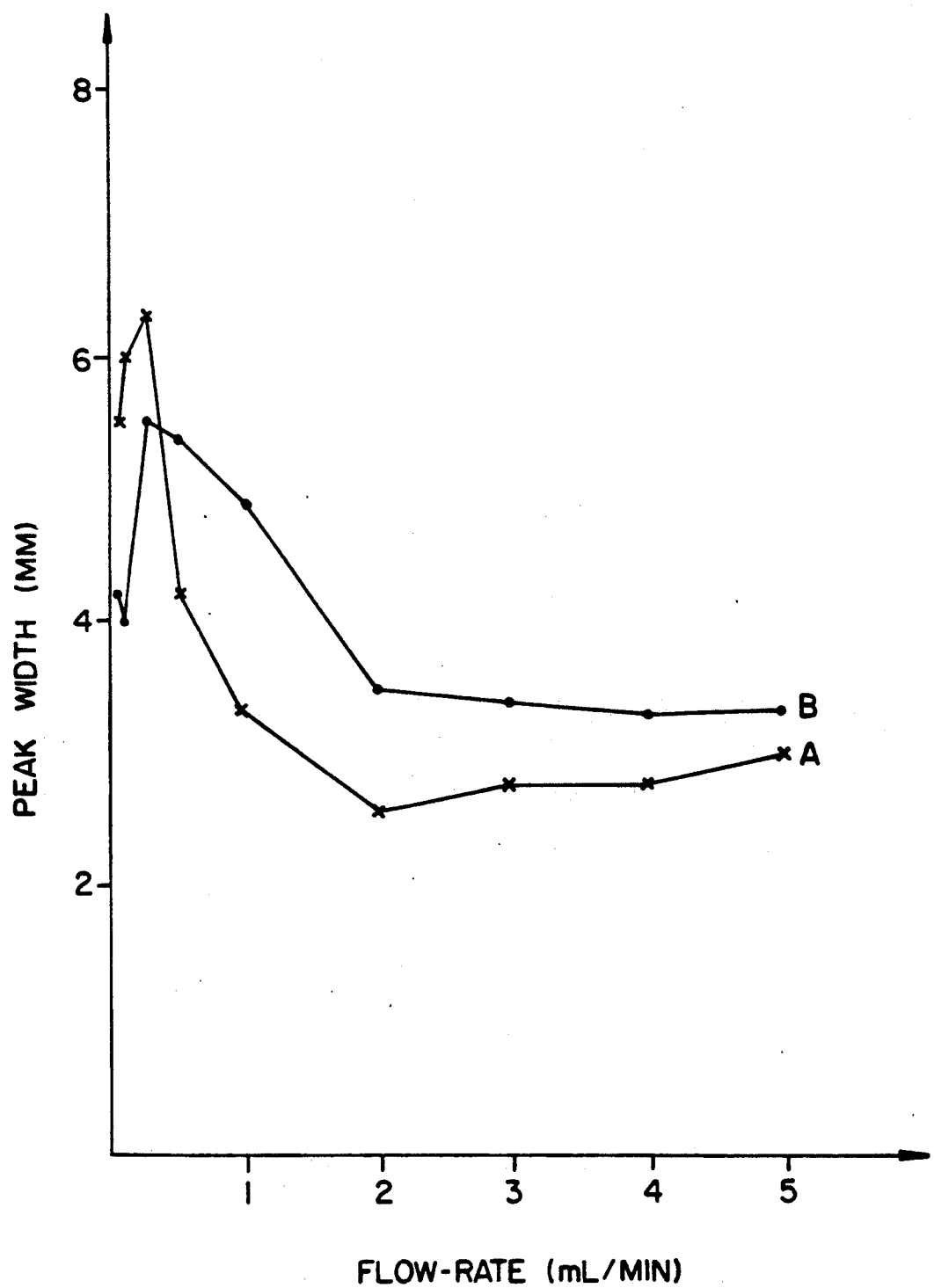
FIG. 15 is a plot of peak width vs. flow rate for a nonporous agarose-based HIC column.

The HIC column of Example 13 was equilibrated with 0.03M sodium phosphate buffer, pH 6.8 (to avoid ion exclusion). A 5-μL sample containing 10 μg of ovalbumin was run at different flow rates. The protein was not adsorbed. The same experiment was done for a sample of protein of low molecular weight, diluted potassium bichromate (5 μL). The peak width at half the height was determined and plotted against flow rate as shown in FIG. 15. Line a of FIG. 15 refers to ovalbumin and shows constant peak width in the flow-rate range of 1-5 mL/min and an increasing peak width at lower flow rates. Line b of FIG. 15 refers to potassium bichromate.

EXAMPLE 21

This example demonstrates the plate number of nonporous agarose beads as a function of flow rate in an isocratic experiment.

The HIC column prepared in Example 13 was equilibrated with 0.01M sodium phosphate, pH 6.8, containing 0.46M ammonium sulfate. A solution of ferritin in the same buffer (25 μg ferritin in 5 μL of the buffer) was then applied and eluted isocratically with the same buffer at a flow rate of 0.5 mL/min. The experiment was then repeated at flow rates of 1, 2, 3, 4 and 5 mL/min.

Figure 16A:
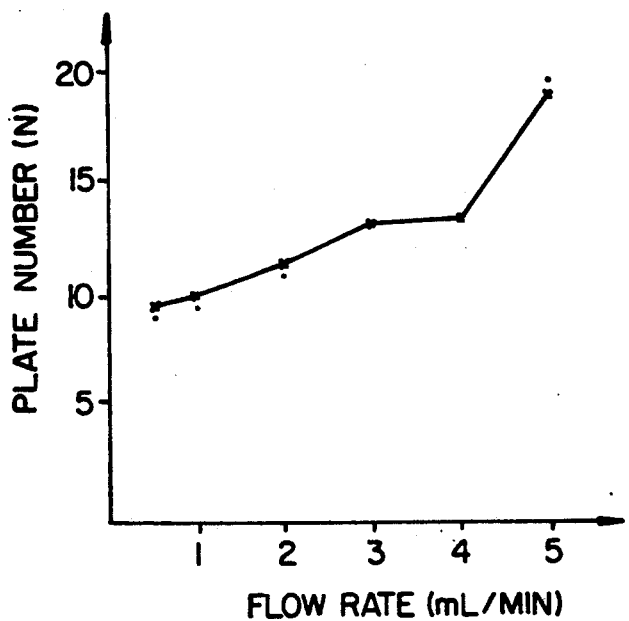
FIGS. 16A, 16B, 16C are a series of plots of plate number vs. flow rate for nonporous agarose and nonporous silica beads.
Figure 16B:
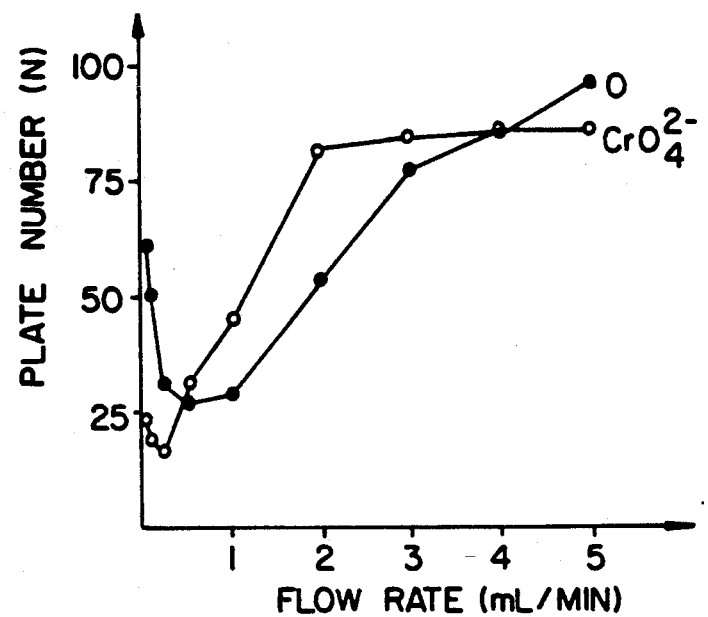
Figure 16C:
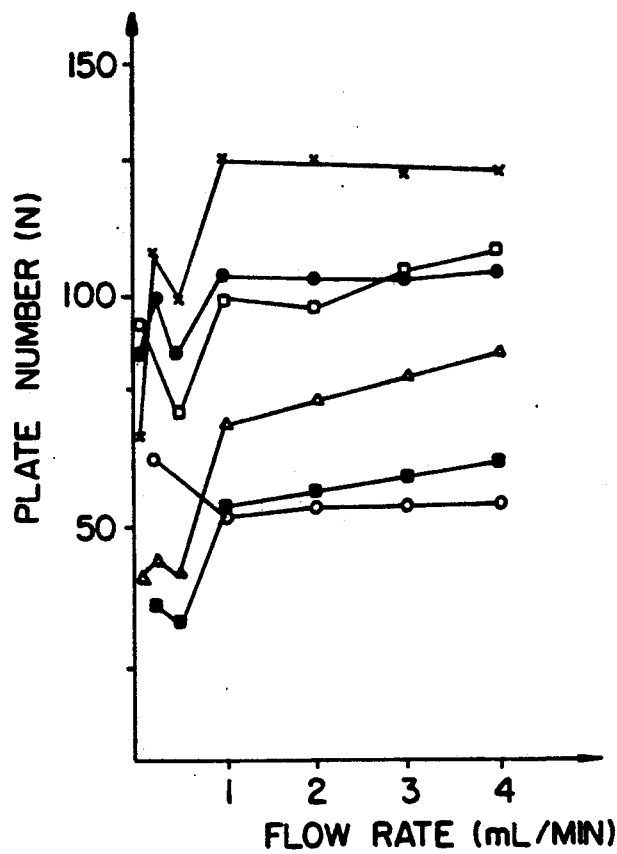

The plate numbers N were then calculated using the well-known relation $$N = 5.54 \, (t/t_w)^2 \qquad (II)$$

where t is the retention time and $t_w$ is the width of the peak in time units at half the peak height. FIG. 16-a is a plot of N vs. flow rate, where the first set of experiments is represented by an "×" for each data point. To test the reproducibility of the experiment, another set of experiments was performed. The results are included in FIG. 16-a as filled circles and open circles.

In another experiment, the sample consisted of 5 μL of ovalbumin (10 μg) and potassium chromate (2 μg). The run was done in 0.03M sodium phosphate, pH 6.8. The lower limit of flow rate was decreased to 0.05 mL/min. The plate numbers are plotted against flow rate in FIG. 16-b. The elution volumes of chromate and ovalbumin were somewhat smaller than the void volume.

EXAMPLE 22

This example illustrates the use of nonporous agarose beads in an HPLC column for separation of hemoglobins.

Phenylboronic acid was attached to glycidol-activated nonporous agarose beads prepared, as described above, with diameters of 13–15 μm. These beads were packed under pressure sufficient to cause compression. This boronate gel column was used for the separation of glycosylated from non-glycosylated hemoglobin from hemolyzed blood without time-consuming centrifugation to remove membranes. Chromatographic conditions were optimized by varying the concentration of sorbitol in the eluting buffer and the pH of equilibrating and eluting buffers. The pH was close to the isoelectric point of hemoglobin, since at this pH hemoglobin has a negligible net charge and will therefore not react with the amino groups of the ligand.

At a flow rate of 5.0 mL/min, an analysis (separation of glycosylated and nonglycosylated hemoglobin) was finished within 2 min on a 6 (i.d.)×20 mm column.

EXAMPLE 23

This example describes the synthesis of nonporous filled agarose beads derivatized with allylglycidyl ether and acrylamide and the preparation of HPLC columns containing the beads.

Five grams of 12% (w/v) agarose beads with a diameter of 40–60 μm were mixed with 5 mL of allylglycidyl ether in 2 mL of dioxane and were retained in the mixture for 1 hour. The agarose beads in a test tube were then suspended in 10 mL of a 10% (w/v) solution of acrylamide and 0.4 mL of potassium persulfate was added, followed by 15 μL of TEMED. The test tube was rotated for 1 hour, and then was washed repeatedly with distilled water.

Following the procedures described in previous examples above, the beads thus prepared were tested for porosity and were found to be impermeable to proteins of molecular weights of 12,000 and above.

A cation exchange column and an anion exchange column were synthesized by mixing the acrylamide in the above description with acrylic acid for the cation exchanger or acrylamide substituted with diethylaminoethyl groups for the anion exchanger.

An amphiphilic bed for HIC can be prepared in an analogous way to the procedures described in previous examples by using an amphiphilic derivative of acrylamide.

EXAMPLE 24

This example demonstrates the preparation of nonporous silica beads by a procedure according to the present invention, using glycidyl only.

Silica beads (1.5 g, 25–40 μm diameter, 100 Å pores) were suspended in 10 mL of dioxane, and glycidol (1.5 mL) was added with stirring, followed by $BF_3$ (200 μL added dropwise). The stirring was continued for one hour. The beads were then washed repeatedly with distilled water, and the glycidol treatment was repeated three times.

To determine the porosity of the beads, a 6×150 mm column was packed with the beads in water and equilibrated with 0.03M sodium phosphate buffer (pH 6.8). Six proteins with different molecular weights ranging from 12,100 to 2,000,000 were then applied together with potassium chromate. All proteins eluted in the same volume, whereas the potassium chromate eluted later. These results are shown in FIG. 2 as line d. The beads were thus determined to be nonporous for proteins with molecular weights above 12,000. The elution further established that the beads had been rendered nonadsorptive of the proteins. In a comparison experiment using untreated silica beads, all of the proteins were adsorbed by the silica.

The plate number was then determined as a function of flow rate in an isocratic experiment. In this experiment, a Plexiglas column (6 mm i.d.) was packed with the treated silica beads in distilled water at constant pressure (45 bar) and compressed with the aid of the movable plunger. The bed dimensions were 6×48 mm.

The column was then equilibrated with 0.01M sodium phosphate, pH 6.8, containing 0.46M ammonium sulfate. Individual protein solutions in the same buffer (25 μg protein in 5 μL of the buffer) were then applied and eluted isocratically with the same buffer at a flow rate of 0.5 mL/min. Solutions of five different proteins were used, as well as a solution of potassium chromate. The experiment was then repeated at flow rates of 1, 2, 3 and 4 mL/min.

The plate numbers N were then calculated using Equation II of Example 21, and the results are shown in FIG. 16-c. Although the plate numbers are low, the data in the figure indicate a clear trend toward an increase in plate number with an increase in flow rate.

The pH stability was then tested using a column measuring 6 mm (i.d.)×25 mm. The column was packed with the treated silica beads, and borate buffer was pumped continuously through the column for 7 days at a flow rate of 1 mL/min. The pressure was 10 bar throughout the experiment, and no void formed at the top of the column, indicating that the glycidol-treated silica beads have a higher pH stability than do untreated silica beads.

EXAMPLE 25

This example demonstrates the preparation of nonporous silica beads by a second procedure according to the present invention, using γ-methacryloxypropyltrimethoxy silane and acrylamide.

Silica beads (2 g, 25–40 μm diameter, 100 Å pores) were suspended in 50 mL of distilled water and stirred for two hours. The beads were then washed with distilled water, and transferred to dioxane by repeated washes in dioxane followed by suspension in 20 mL of dioxane. While the suspension was being stirred, 3 mL of γ-methacryloxypropyltrimethoxy silane was added dropwise. Stirring was continued for 1 hour at room temperature, following which the beads were washed with four 5-mL portions of dioxane and then transferred to water by a similar washing procedure. The water-washed beads were then suspended in 10 mL of a 8% (w/v) solution of acrylamide in a centrifuge tube. After deaeration, 40 mg of ammonium persulfate was added followed by 15 μL of TEMED. The centrifuge tube, covered with a lid, was rotated for 1 hour, after which the beads were washed repeatedly with distilled water.

To determine the porosity of the beads, a 6×150 mm column was packed with the beads in water and equilibrated with 0.01M sodium phosphate buffer (pH 6.8). Five proteins with different molecular weights ranging from 12,100 to 2,000,000 were then applied together with potassium chromate. All proteins eluted in the same volume whereas the potassium chromate was eluted later. These results are shown in FIG. 2 as line e. The beads were thus determined to be nonporous for proteins with molecular weights above 12,000.

EXAMPLE 26

This example demonstrates the preparation of nonporous silica beads by a third procedure according to the present invention, using γ-methacryloxypropyltrimethoxy silane and N-methylolacrylamide.

Using the procedure described in Example 25, γ-methacryloxypropyltrimethoxy silane was coupled to 2 g of silica beads. The acrylamide solution of Example 25, however, was replaced by 10 mL of a 6% solution of N-methylolacrylamide. The amount of ammonium persulfate was 20 mg, and the amount of TEMED was 10 μL. The treatment with γ-methacryloxypropyltrimethoxy silane and N-methylolacrylamide was then repeated.

Porosity was determined on both the single-treatment beads and the double-treatment beads, in the same manner as that described above in Example 25, using six different proteins over the same molecular weight range for each set of beads. The results with the single-treatment beads are shown in FIG. 2 as line f', whereas the results with double-treatment beads are shown as line f. The single-treatment line indicates some variation in retention times while the double-treatment line does not. This indicates that the single treatment did not completely eliminate protein adsorption.

EXAMPLE 27

This example illustrates the surface derivatization of nonporous silica beads.

The silica beads rendered nonporous in Example 24 by treatment with glycidol were crosslinked with 1,3-butadiene diepoxide, using conventional techniques. This caused the diameter of the beads to increase to 35–40 μm. About 2 g of these silica beads were washed with distilled water, and then transferred to dioxane using the procedures described above. After suspension of the beads in 15 mL of dioxane, 0.1 mL of hexylglycidyl ether was added with stirring, followed by dropwise addition 0.1 mL of BF3 diluted in 5 mL of dioxane. After a reaction time of 1 hour, the resulting hexylglycidyl silica beads were washed with distilled water and crosslinked again with 1,3-butadiene diepoxide.

Figure 17:
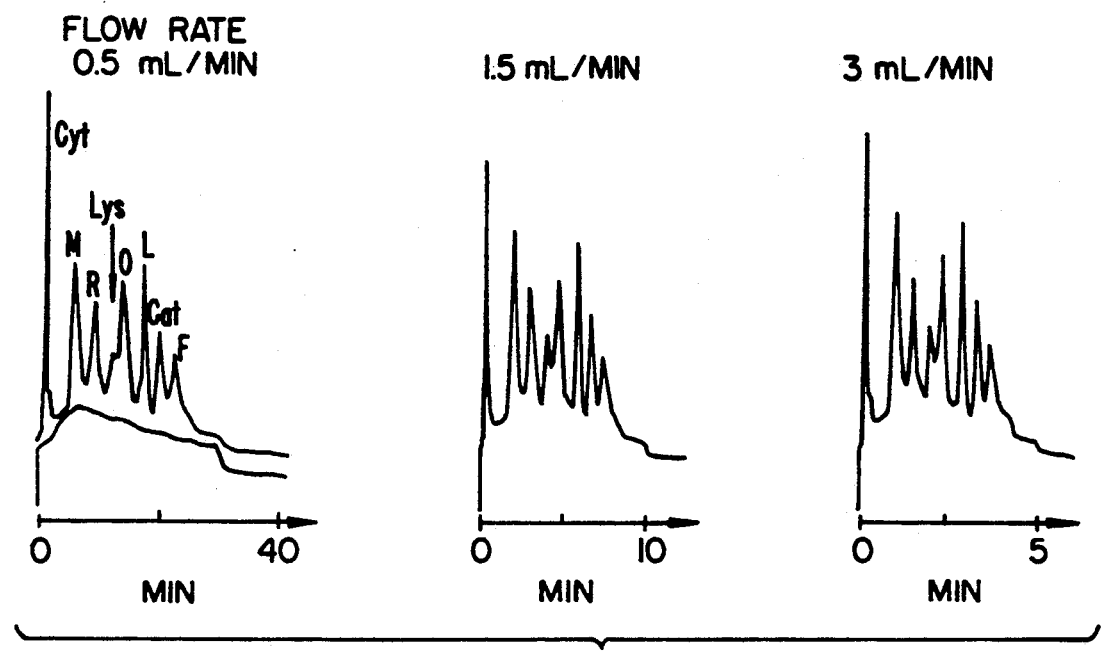
FIG. 17 is a series of chromatograms in hydrophobic interaction chromatography experiments using nonporous silica beads at various flow rates.
Figure 18:
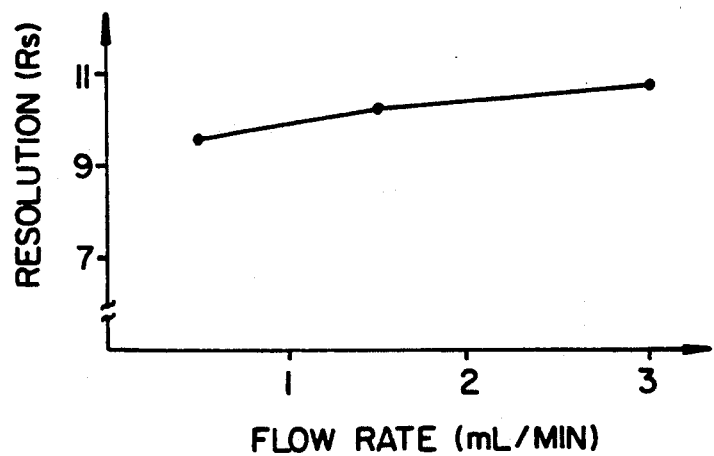
FIG. 18 is a plot of resolution vs. flow rate taken from the chromatograms of FIG. 17.

To prepare an HIC column of these beads, a Plexiglas column was packed with the beads in distilled water at a constant flow rate of 5 mL/min, and equilibrated with 0.01 sodium phosphate, pH 6.8, containing 3M ammonium sulfate. The bed was then compressed manually with the aid of a movable plunger. The bed dimensions after compression were 6 mm (i.d.)×25 mm. A sample was then eluted on the column at flow rates of 0.5, 1.5 and 3 mL/min with a 15-mL gradient formed from the equilibration buffer to 0.01M sodium phosphate, pH 6.8, without ammonium sulfate. The sample consisted of 14 μL (70 μg) of the following eight proteins: cytochrome C ("Cyt," 10 μg), myoglobin ("M," 10 μg), ribonuclease ("R," 10 μg), lysozyme ("Lys," 5 μg), catalase ("Cat," 10 μg) and ferritin ("F," 10 μg). The three chromatograms appear in FIG. 17 and the resolution $R_s$ between myoglobin and lactate dehydrogenase, determined in accordance with Equation I above, appears in FIG. 18. The latter indicates that the resolution improves with increasing flow rate.

Although the present invention has been described in some detail by way of example for purposes of clarity and understanding, it will be apparent that other arrangements and equivalents are possible and may be employed without departing from the spirit and scope of the invention. Therefore, the description and illustrations should not be construed as limiting the scope of the invention, which is delineated by the appended claims.

What is claimed is:

1. A method for converting agarose beads with pores filled with an aqueous medium and of sufficient porosity to be permeable to proteins, to beads of sufficiently low porosity to be substantially impermeable to proteins, said method comprising:
   (a) treating said agarose beads with a first organic solvent in which agarose is soluble but which promotes swelling of agarose, to weaken the agarose while retaining said agarose in the form of beads;
   (b) replacing substantially all of said first organic solvent and any remaining water in said agarose beads with a second organic solvent which neither dissolves nor swells the agarose to cause the pores of said agarose beads to at least partially collapse, thereby imparting to said beads a reduced porosity;
   (c) placing an agarose crosslinking agent inside the pores of said beads; and
   (d) causing said crosslinking agent to crosslink the agarose inside said pores to fix said reduced porosity.

2. A method in accordance with claim 1 in which said crosslinking agent is a member selected from the group consisting of epoxides, bisepoxides and trisepoxides.

3. A method in accordance with claim 1 in which said crosslinking agent is a member selected from the group consisting of 1,4-butanediol diglycidyl ether and γ-glycidoxypropyltrimethoxy silane.

4. A method in accordance with claim 1 in which said second organic solvent is one tending to avoid aggregation of agarose beads.

5. A method in accordance with claim 1 in which said first organic solvent is water-miscible, and miscible with said second organic solvent.

6. A method in accordance with claim 1 in which said agarose beads having an average bead diameter ranging from about 3 microns to about 300 microns.

7. A method in accordance with claim 1 in which said agarose beads having an average bead diameter ranging from about 10 microns to about 100 microns.

8. A method in accordance with claim 1 in which said agarose beads have an agarose concentration ranging from about 8% to about 20% by weight.

9. A method in accordance with claim 1 in which said agarose beads have an agarose concentration ranging from about 10% to about 15% by weight.

10. A method in accordance with claim 1 in which said reduced porosity is sufficiently reduced to render the agarose beads resulting from step (c) nonpermeable to proteins of molecular weight 12,000 and higher.

11. A method in accordance with claim 1 in which said reduced porosity is sufficiently reduced to render the agarose beads resulting from step (c) nonpermeable to proteins of molecular weight 10,000 and higher.

12. A method in accordance with claim 1 in which said reduced porosity is sufficiently reduced to render the agarose beads resulting from step (c) nonpermeable to proteins of molecular weight 3,000 and higher.

* * * * *